(12) United States Patent
    Peng et al.

(10) Patent No.: US 12,684,547 B2
(45) Date of Patent: Jul. 14, 2026

(54) COMMUNICATION METHOD AND COMMUNICATION APPARATUS

(71) Applicant: HUAWEI TECHNOLOGIES CO., LTD., Shenzhen (CN)

(72) Inventors: Xiaohui Peng, Shenzhen (CN); Jiajin Luo, Shenzhen (CN); Baojian Zhou, Shenzhen (CN); Xiaoyue Hou, Shenzhen (CN); Min Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/471,304

(22) Filed: Sep. 21, 2023

(65) Prior Publication Data
    US 2024/0023078 A1     Jan. 18, 2024

Related U.S. Application Data

(63) Continuation of application No. PCT/CN2022/082653, filed on Mar. 24, 2022.

(30) Foreign Application Priority Data

Mar. 25, 2021   (CN) ......................... 202110321050.X

(51) Int. Cl.
    *H04W 72/0453*      (2023.01)
    *H04W 72/51*        (2023.01)

(52) U.S. Cl.
    CPC ....... *H04W 72/0453* (2013.01); *H04W 72/51* (2023.01)

(58) Field of Classification Search
    None
    See application file for complete search history.

(56) References Cited

U.S. PATENT DOCUMENTS

| | | | |
|---|---|---|---|
| 2019/0219688 A1 | 7/2019 | Liu et al. | |
| 2020/0196282 A1* | 6/2020 | Wang ...................... | H04W 4/06 |
| 2020/0359354 A1* | 11/2020 | Lee ........................... | G01S 11/02 |
| 2021/0076367 A1* | 3/2021 | Bayesteh .............. | G01S 7/0232 |
| 2021/0270951 A1 | 9/2021 | Yoshizawa | |
| 2022/0317240 A1* | 10/2022 | Rydström ............. | G01S 13/931 |
| 2022/0330330 A1* | 10/2022 | Liu ...................... | H04W 74/085 |

FOREIGN PATENT DOCUMENTS

| | | |
|---|---|---|
| CN | 108282879 A | 7/2018 |
| EP | 3748879 A1 | 12/2020 |
| JP | 2008145425 A | 6/2008 |
| JP | 2014160059 A | 9/2014 |
| WO | 2020017475 A1 | 1/2020 |

OTHER PUBLICATIONS

Ruben Morales Ferre et al:"Positioning Reference Signal design for positioning via 5G."Oct. 2019, total 4 pages.
Neena Damodaran et al:"Device free human activity and fall recognition using WiFi channel state information (CSI)."Jan. 30, 2020, total 17 pages.

* cited by examiner

*Primary Examiner* — Srinivasa R Reddivalam

(57)     ABSTRACT

A first communication apparatus determines a first frequency domain resource, where the first frequency domain resource is determined from a frequency domain resource pool based on a sensing requirement parameter. The first communication apparatus sends a sensing signal on the first frequency domain resource.

20 Claims, 11 Drawing Sheets

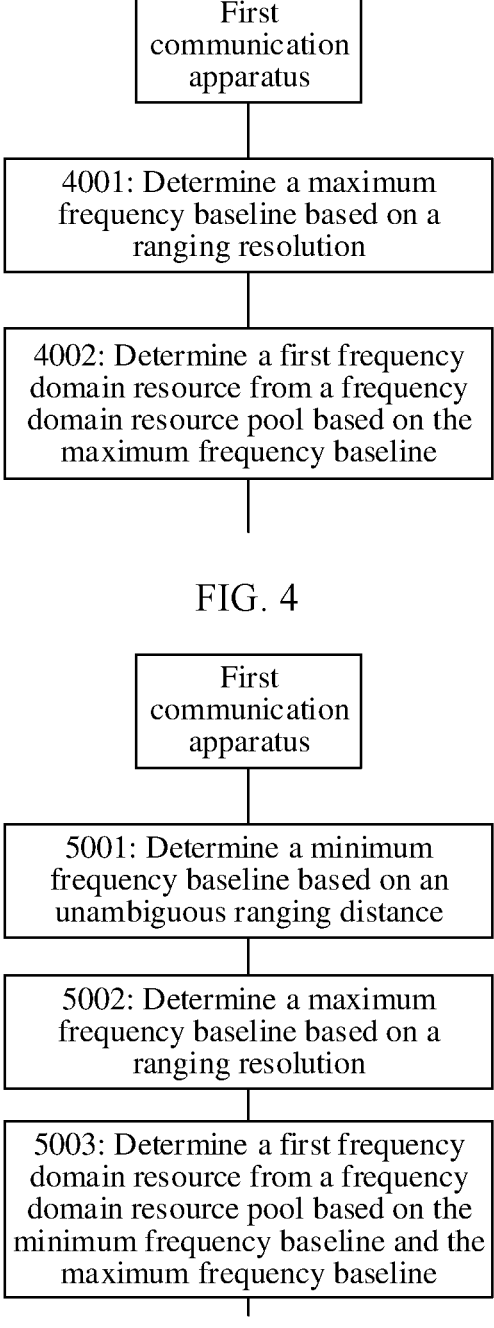

First
communication
apparatus

4001: Determine a maximum
frequency baseline based on a
ranging resolution

4002: Determine a first frequency
domain resource from a frequency
domain resource pool based on the
maximum frequency baseline

FIG. 4

First
communication
apparatus

5001: Determine a minimum
frequency baseline based on an
unambiguous ranging distance 5002: Determine a maximum
frequency baseline based on a
ranging resolution 5003: Determine a first frequency
domain resource from a frequency
domain resource pool based on the
minimum frequency baseline and the
maximum frequency baseline

FIG. 5

Frequency point combination

Frequency point combination

COMMUNICATION METHOD AND COMMUNICATION APPARATUS

CROSS-REFERENCE TO RELATED APPLICATIONS

This application is a continuation of International Application No. PCT/CN2022/082653, filed on Mar. 24, 2022, which claims priority to Chinese Patent Application No. 202110321050.X, filed on Mar. 25, 2021. The disclosures of the aforementioned applications are hereby incorporated by reference in their entireties.

TECHNICAL FIELD

This application relates to communication technologies, and in particular, to a communication method and a communication apparatus.

BACKGROUND

In a wireless sensing technology, a change of a wireless signal during propagation is analyzed to obtain a feature of signal transmission space, to implement sensing of an object or a person in an environment. For example, the wireless sensing technology is used to sense a person, a building, a vehicle, or the like in the environment.

Radar is a classic wireless sensing technology, and is widely used in military, agriculture, meteorology, and other fields. A basic principle of radar is as follows: A transmitter transmits a specific waveform signal, and a signal is received by a receiver after the transmitted signal passes through a wireless channel. Signal processing is performed with reference to the transmitted signal and the received signal, to extract an object of interest in the wireless channel. A main function of a wireless communication system is to exchange information between transceivers, and a basic principle of the wireless communication system is as follows: A transmitter transmits a specific waveform signal, and a signal is received by a receiver after the transmitted signal passes through a wireless channel. After signal processing, the signal transmitted by the transmitter is obtained through demodulation.

It can be learned that from the perspective of processes including transmitting, transmission, reception, and the like, a radar sensing process is very similar to a wireless communication process. Therefore, how to integrate wireless communication and a sensing technology to implement sensing of a surrounding environment while implementing wireless communication is an urgent problem to be resolved currently.

SUMMARY

Embodiments of this application provide a communication method and a communication apparatus, so that the communication apparatus implements sensing of a surrounding environment while performing communication. Further, a communication resource is determined with reference to a sensing requirement parameter, so that a sensing requirement can be met, and sensing performance can be improved.

According to a first aspect in embodiments of this application, a communication method is provided. The method includes:

A first communication apparatus determines a first frequency domain resource, where the first frequency domain resource is determined from a frequency domain resource pool based on a sensing requirement parameter. Then, the first communication apparatus sends a sensing signal on the first frequency domain resource.

In this embodiment, the first frequency domain resource is selected from the frequency domain resource pool based on the sensing requirement parameter. The first communication apparatus may send the sensing signal on the first frequency domain resource. In this way, the first communication apparatus may implement sensing of a surrounding environment by sending the sensing signal while performing communication. Further, the first frequency domain resource is determined with reference to the sensing requirement parameter. In this way, a sensing requirement can be met, and sensing performance can be improved.

In a possible implementation, the sensing requirement parameter includes at least one of the following: an unambiguous ranging distance or a ranging resolution.

In this implementation, content specifically included in the sensing requirement parameter is provided, and indicate a requirement for performing sensing ranging by using the sensing signal. In other words, the sensing requirement parameter indicates a requirement for the first communication apparatus or a second communication apparatus to perform sensing measurement by using the sensing signal.

In another possible implementation, the method further includes: The first communication apparatus obtains the sensing requirement parameter. That a first communication apparatus determines a first frequency domain resource includes: The first communication apparatus determines the first frequency domain resource from the frequency domain resource pool based on the sensing requirement parameter.

In this possible implementation, a specific implementation in which the first communication apparatus determines the first frequency domain resource is provided. The first communication apparatus may obtain the sensing requirement parameter, and determine the first frequency domain resource with reference to the sensing requirement parameter. In this way, the sensing requirement can be met, and the sensing performance can be improved.

In another possible implementation, the sensing requirement parameter includes the unambiguous ranging distance, the first frequency domain resource meets a minimum frequency baseline, and the minimum frequency baseline is determined based on the unambiguous ranging distance.

Alternatively, the sensing requirement parameter includes the ranging resolution, the first frequency domain resource meets a maximum frequency baseline, and the maximum frequency baseline is determined based on the ranging resolution.

Alternatively, the sensing requirement parameter includes the unambiguous ranging distance and the ranging resolution, and the first frequency domain resource meets a minimum frequency baseline and a maximum frequency baseline.

In this possible implementation, a plurality of possible implementations of the content specifically included in the sensing requirement parameter, and requirements that the first frequency domain resource needs to meet in these implementations are provided.

In another possible implementation, the first frequency domain resource includes a frequency point combination, and the frequency point combination is a frequency point combination that meets a first condition. The first condition includes: Frequency baselines formed by frequency points included in the frequency point combination include a frequency baseline of a first length. The first length is k*length of the minimum frequency baseline, k is a positive integer belonging to [1, K], K is a ratio of a length of the maximum frequency baseline to the length of the minimum frequency baseline, and K is greater than or equal to 1.

In this possible implementation, the first frequency domain resource includes the frequency point combination, and the frequency point combination obtained in the foregoing implementation may meet that the frequency baselines formed by the frequency point combination have complete frequency coverage, in other words, the frequency point combination meets a coverage integrity requirement. In this way, sensing ranging can be performed on a plurality of sensing target points in the surrounding environment, and the sensing performance can be further improved.

In another possible implementation, the frequency point combination includes a subcarrier combination, and the subcarrier combination is a subcarrier combination with a smallest quantity of subcarriers in a subcarrier combination that meets the minimum frequency baseline, the maximum frequency baseline, and the first condition.

In this possible implementation, there may be a plurality of subcarrier combinations that meet the minimum frequency baseline, the maximum frequency baseline, and the first condition. In this case, the subcarrier combination may be a subcarrier combination with a smallest quantity of subcarriers in the plurality of subcarrier combinations. In this way, the subcarrier combination with the smallest quantity of subcarriers is selected under a condition that the maximum frequency baseline and the minimum frequency baseline are met and complete frequency baseline coverage is ensured, so that subcarrier overheads in frequency domain are effectively reduced. This avoids occupying excessive communication resources and affecting communication performance.

In another possible implementation, the method further includes: The first communication apparatus sends first information to the second communication apparatus, where the first information indicates a frequency domain position of the first frequency domain resource.

In this possible implementation, the first communication apparatus indicates the frequency domain position of the first frequency domain resource to the second communication apparatus. In this way, the second communication apparatus may receive the sensing signal on a frequency domain position of the first frequency domain resource, to implement sensing measurement on the surrounding environment.

In another possible implementation, the first information includes the frequency domain position of the first frequency domain resource. Alternatively, the first information includes a sensing quality index, and the sensing quality index indicates the frequency domain position of the first frequency domain resource.

In this possible implementation, two specific implementations in which the first information indicates the frequency domain position of the first frequency domain resource are provided. Specifically, the first information may directly indicate the frequency domain position of the first frequency domain resource, and an indication manner is simple. Alternatively, the first information indirectly indicates the frequency domain position of the first frequency domain resource in an index manner, and the indication manner requires a small quantity of indication bits, so that overheads of indication bits can be reduced.

In another possible implementation, the first information is carried in radio resource control (RRC) signaling or downlink control information (DCI) signaling.

In this possible implementation, two types of possible signaling that carry the first information are provided, to provide a basis for this embodiment of this solution.

In another possible implementation, the method further includes: The first communication apparatus sends trigger signaling to the second communication apparatus, where the trigger signaling is used to trigger the second communication apparatus to enable a sensing function.

In this possible implementation, a trigger condition for triggering the second communication apparatus to enable the sensing function is provided, to provide a basis for this embodiment of this solution.

In another possible implementation, a type of the trigger signaling includes RRC signaling or DCI signaling.

In this implementation, the RRC signaling or the DCI signaling may be used to trigger the second communication apparatus to enable the sensing function.

In another possible implementation, that the first communication apparatus obtains the sensing requirement parameter includes: The first communication apparatus receives the sensing requirement parameter from a third communication apparatus.

In this implementation, the requirement sensing parameter may be delivered by the third communication apparatus to the first communication apparatus. The third communication apparatus may be understood as a control node, and controls the first communication apparatus to send the sensing signal.

In another possible implementation, the frequency domain resource pool includes a frequency domain resource used to transmit a channel state information reference signal between the first communication apparatus and the second communication apparatus.

Alternatively, the frequency domain resource pool includes a frequency domain resource used to transmit communication data between the first communication apparatus and the second communication apparatus.

In this possible implementation, two possible communication resources included in the frequency domain resource pool are provided, and the two possible communication resources may be used to select the first frequency domain resource, so that the communication apparatus implements sensing of the surrounding environment while performing communication.

According to a second aspect in embodiments of this application, a communication method is provided. The method includes:

A second communication apparatus determines a first frequency domain resource, where the first frequency domain resource is determined from a frequency domain resource pool based on a sensing requirement parameter. Then, the second communication apparatus receives a sensing signal from a first communication apparatus on the first frequency domain resource. The second communication apparatus performs sensing measurement on the sensing signal, to obtain a sensing result.

In this embodiment, the first frequency domain resource is selected from the frequency domain resource pool based on the sensing requirement parameter. The second communication apparatus receives the sensing signal from the first communication apparatus on the first frequency domain resource. In this way, the second communication apparatus may implement sensing of a surrounding environment by receiving the sensing signal from the first communication apparatus while performing communication. Further, the first frequency domain resource is determined with reference to the sensing requirement parameter. In this way, a sensing requirement can be met, and sensing performance can be improved.

In a possible implementation, the sensing requirement parameter includes at least one of the following: an unambiguous ranging distance or a ranging resolution.

In this implementation, content specifically included in the sensing requirement parameter is provided, and indicate a requirement for performing sensing ranging by using the sensing signal. In other words, the sensing requirement parameter indicates a requirement for the first communication apparatus or the second communication apparatus to perform sensing measurement by using the sensing signal.

In another possible implementation, the method further includes: The second communication apparatus receives first information from the first communication apparatus, where the first information indicates a frequency domain position of the first frequency domain resource.

In this possible implementation, the second communication apparatus receives the frequency domain position that is of the first frequency domain resource and that is indicated by the first communication apparatus. In this way, the second communication apparatus may receive the sensing signal on a frequency domain position of the first frequency domain resource, to implement sensing measurement on the surrounding environment.

In another possible implementation, the first information includes the frequency domain position of the first frequency domain resource. Alternatively, the first information includes a sensing quality index, and the sensing quality index indicates the frequency domain position of the first frequency domain resource.

In this possible implementation, two specific implementations in which the first information indicates the frequency domain position of the first frequency domain resource are provided. Specifically, the first information may directly indicate the frequency domain position of the first frequency domain resource, and an indication manner is simple. Alternatively, the first information indirectly indicates the frequency domain position of the first frequency domain resource in an index manner, and the indication manner requires a small quantity of indication bits, so that overheads of indication bits can be reduced.

In another possible implementation, the first information is carried in RRC signaling or DCI signaling.

In this possible implementation, two types of possible signaling that carry the first information are provided, to provide a basis for this embodiment of this solution.

In another possible implementation, the method further includes: The second communication apparatus obtains the sensing requirement parameter. That a second communication apparatus determines a first frequency domain resource includes: The second communication apparatus determines the first frequency domain resource from the frequency domain resource pool based on the sensing requirement parameter.

In this possible implementation, a specific implementation in which the second communication apparatus determines the first frequency domain resource is provided. The second communication apparatus may obtain the sensing requirement parameter, and determines the first frequency domain resource with reference to the sensing requirement parameter. In this way, the sensing requirement can be met, and the sensing performance can be improved.

In another possible implementation, the sensing requirement parameter includes the unambiguous ranging distance, the first frequency domain resource meets a minimum frequency baseline, and the minimum frequency baseline is determined based on the unambiguous ranging distance.

Alternatively, the sensing requirement parameter includes the ranging resolution, the first frequency domain resource meets a maximum frequency baseline, and the maximum frequency baseline is determined based on the ranging resolution.

Alternatively, the sensing requirement parameter includes the unambiguous ranging distance and the ranging resolution, and the first frequency domain resource meets a minimum frequency baseline and a maximum frequency baseline.

In this possible implementation, a plurality of possible implementations of the content specifically included in the sensing requirement parameter, and requirements that the first frequency domain resource needs to meet in these implementations are provided.

In another possible implementation, the method further includes: The second communication apparatus receives trigger signaling from the first communication apparatus, where the trigger signaling is used to trigger the second communication apparatus to enable a sensing function.

In this possible implementation, a trigger condition for triggering the second communication apparatus to enable the sensing function is provided, to provide a basis for this embodiment of this solution.

In another possible implementation, a type of the trigger signaling includes RRC signaling or DCI signaling. In this implementation, the RRC signaling or the DCI signaling may be used to trigger the second communication apparatus to enable the sensing function.

In another possible implementation, the frequency domain resource pool includes a frequency domain resource used to transmit a channel state information reference signal between the first communication apparatus and the second communication apparatus.

Alternatively, the frequency domain resource pool includes a frequency domain resource used to transmit communication data between the first communication apparatus and the second communication apparatus.

In this possible implementation, two possible communication resources included in the frequency domain resource pool are provided, and the two possible communication resources may be used to select the first frequency domain resource, so that the communication apparatus implements sensing of the surrounding environment while performing communication.

According to a third aspect in embodiments of this application, a first communication apparatus is provided. The first communication apparatus includes:

a processing module, configured to determine a first frequency domain resource, where the first frequency domain resource is determined from a frequency domain resource pool based on a sensing requirement parameter; and a transceiver module, configured to send a sensing signal on the first frequency domain resource.

In a possible implementation, the sensing requirement parameter includes at least one of the following: an unambiguous ranging distance or a ranging resolution.

In another possible implementation, the transceiver module is further configured to:

obtain the sensing requirement parameter; and the processing module is specifically configured to:

determine the first frequency domain resource from the frequency domain resource pool based on the sensing requirement parameter.

In another possible implementation, the sensing requirement parameter includes the unambiguous ranging distance, the first frequency domain resource meets a minimum frequency baseline, and the minimum frequency baseline is determined based on the unambiguous ranging distance.

Alternatively, the sensing requirement parameter includes the ranging resolution, the first frequency domain resource meets a maximum frequency baseline, and the maximum frequency baseline is determined based on the ranging resolution.

Alternatively, the sensing requirement parameter includes the unambiguous ranging distance and the ranging resolution, and the first frequency domain resource meets a minimum frequency baseline and a maximum frequency baseline.

In another possible implementation, the first frequency domain resource includes a frequency point combination, and the frequency point combination is a frequency point combination that meets a first condition. The first condition includes: Frequency baselines formed by frequency points included in the frequency point combination include a frequency baseline of a first length. The first length is k*length of the minimum frequency baseline, k is a positive integer belonging to [1, K], K is a ratio of a length of the maximum frequency baseline to the length of the minimum frequency baseline, and K is greater than or equal to 1.

In another possible implementation, the frequency point combination includes a subcarrier combination, and the subcarrier combination is a subcarrier combination with a smallest quantity of subcarriers in a subcarrier combination that meets the minimum frequency baseline, the maximum frequency baseline, and the first condition.

In another possible implementation, the transceiver module is further configured to:

send first information to a second communication apparatus, where the first information indicates a frequency domain position of the first frequency domain resource.

In another possible implementation, the first information includes the frequency domain position of the first frequency domain resource. Alternatively, the first information includes a sensing quality index, and the sensing quality index indicates the frequency domain position of the first frequency domain resource.

In another possible implementation, the first information is carried in RRC signaling or DCI signaling.

In another possible implementation, the transceiver module is further configured to:

send trigger signaling to the second communication apparatus, where the trigger signaling is used to trigger the second communication apparatus to enable a sensing function.

In another possible implementation, a type of the trigger signaling includes RRC signaling or DCI signaling.

In another possible implementation, the transceiver module is specifically configured to:

receive the sensing requirement parameter from a third communication apparatus.

In another possible implementation, the frequency domain resource pool includes a frequency domain resource used to transmit a channel state information reference signal between the first communication apparatus and the second communication apparatus.

Alternatively, the frequency domain resource pool includes a frequency domain resource used to transmit communication data between the first communication apparatus and the second communication apparatus.

According to a fourth aspect in embodiments of this application, a second communication apparatus is provided. The second communication apparatus includes:

a processing module, configured to determine a first frequency domain resource, where the first frequency domain resource is determined from a frequency domain resource pool based on a sensing requirement parameter; and a transceiver module, configured to receive a sensing signal from a first communication apparatus on the first frequency domain resource, where the processing module is further configured to perform sensing measurement on the sensing signal, to obtain a sensing result.

In a possible implementation, the sensing requirement parameter includes at least one of the following: an unambiguous ranging distance or a ranging resolution.

In another possible implementation, the transceiver module is further configured to:

receive first information from the first communication apparatus, where the first information indicates a frequency domain position of the first frequency domain resource.

In another possible implementation, the first information includes the frequency domain position of the first frequency domain resource. Alternatively, the first information includes a sensing quality index, and the sensing quality index indicates the frequency domain position of the first frequency domain resource.

In another possible implementation, the first information is carried in RRC signaling or DCI signaling.

In another possible implementation, the transceiver module is further configured to:

obtain the sensing requirement parameter; and the processing module is specifically configured to:

determine the first frequency domain resource from the frequency domain resource pool based on the sensing requirement parameter.

In another possible implementation, the sensing requirement parameter includes the unambiguous ranging distance, the first frequency domain resource meets a minimum frequency baseline, and the minimum frequency baseline is determined based on the unambiguous ranging distance.

Alternatively, the sensing requirement parameter includes the ranging resolution, the first frequency domain resource meets a maximum frequency baseline, and the maximum frequency baseline is determined based on the ranging resolution.

Alternatively, the sensing requirement parameter includes the unambiguous ranging distance and the ranging resolution, and the first frequency domain resource meets a minimum frequency baseline and a maximum frequency baseline.

In another possible implementation, the transceiver module is further configured to:

receive trigger signaling from the first communication apparatus, where the trigger signaling is used to trigger the second communication apparatus to enable a sensing function.

In another possible implementation, a type of the trigger signaling includes RRC signaling or DCI signaling.

In another possible implementation, the frequency domain resource pool includes a frequency domain resource used to transmit a channel state information reference signal between the first communication apparatus and the second communication apparatus.

Alternatively, the frequency domain resource pool includes a frequency domain resource used to transmit communication data between the first communication apparatus and the second communication apparatus.

According to a fifth aspect in embodiments of this application, a first communication apparatus is provided. The first communication apparatus includes: a processor and a memory. The memory stores a computer program or computer instructions, and the processor is further configured to invoke and run the computer program or the computer instructions stored in the memory, so that the processor implements any implementation of the first aspect.

Optionally, the first communication apparatus further includes a transceiver, and the processor is configured to control the transceiver to receive and transmit signals.

According to a sixth aspect in embodiments of this application, a second communication apparatus is provided. The second communication apparatus includes: a processor and a memory. The memory stores a computer program or computer instructions, and the processor is further configured to invoke and run the computer program or the computer instructions stored in the memory, so that the processor implements any implementation of the second aspect.

Optionally, the second communication apparatus further includes a transceiver, and the processor is configured to control the transceiver to receive and transmit signals.

According to a seventh aspect in embodiments of this application, a computer program product including computer instructions is provided. When the computer program product runs on a computer, any implementation of the first aspect or the second aspect is performed.

According to an eighth aspect in embodiments of this application, a computer-readable storage medium is provided. The computer-readable storage medium includes computer instructions. When the computer instructions are run on a computer, any implementation of the first aspect or the second aspect is performed.

According to a ninth aspect in embodiments of this application, a chip apparatus is provided. The chip apparatus includes a processor, configured to connect to a memory and invoke a program stored in the memory, so that the processor performs any implementation of the first aspect or the second aspect.

According to a tenth aspect in embodiments of this application, a communication system is provided. The communication system includes the first communication apparatus according to the first aspect and the second communication apparatus according to the second aspect.

It can be learned from the foregoing technical solutions that embodiments of this application have the following advantages:

It can be learned from the foregoing technical solutions that the first communication apparatus determines the first frequency domain resource, where the first frequency domain resource is determined from the frequency domain resource pool based on the sensing requirement parameter. Then, the first communication apparatus sends the sensing signal on the first frequency domain resource. It can be learned that, in the technical solutions of this application, the first frequency domain resource is selected from the frequency domain resource pool based on the sensing requirement parameter. The first communication apparatus may send the sensing signal on the first frequency domain resource. In this way, the first communication apparatus may implement sensing of the surrounding environment by sending the sensing signal while performing communication. Further, the first frequency domain resource is determined with reference to the sensing requirement parameter. In this way, the sensing requirement can be met, and the sensing performance can be improved.

BRIEF DESCRIPTION OF DRAWINGS

FIG. 4 is another schematic flowchart of a communication method according to an embodiment of this application;

FIG. 5 is another schematic flowchart of a communication method according to an embodiment of this application;

DESCRIPTION OF EMBODIMENTS

Figures 1A, 1B:
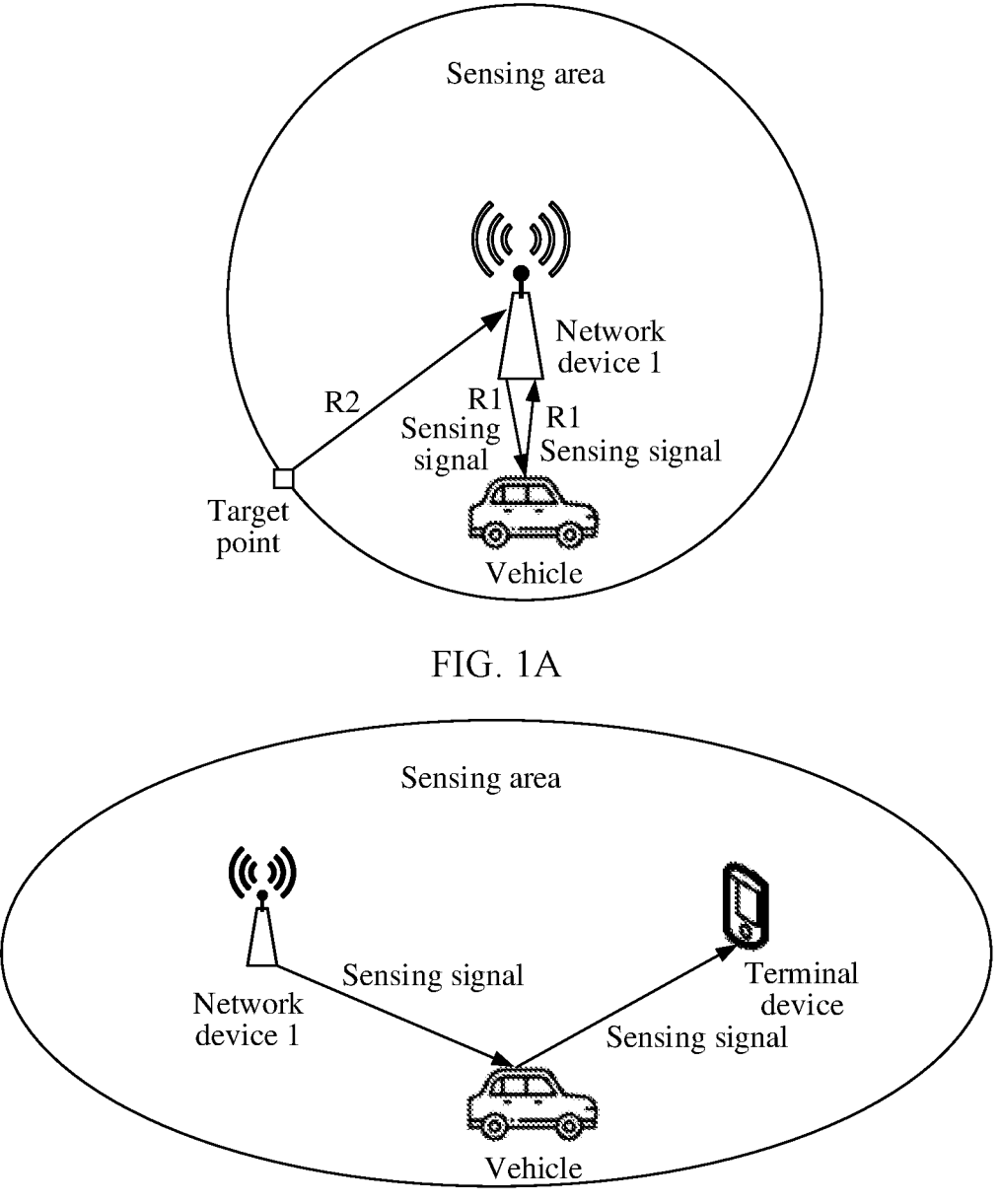
FIG. 1A is a schematic diagram of an application scenario according to an embodiment of this application.
FIG. 1B is a schematic diagram of another application scenario according to an embodiment of this application.

Embodiments of this application provide a communication method and a communication apparatus, so that the communication apparatus implements sensing of a surrounding environment while performing communication.

The following clearly describes technical solutions in embodiments of this application with reference to accompanying drawings in embodiments of this application. Clearly, the described embodiments are merely some but not all of embodiments of this application. All other embodiments obtained by persons skilled in the art based on embodiments of this application without creative efforts shall fall within the protection scope of this application.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment, but instead mean "one or more but not all embodiments", unless otherwise specifically emphasized in another manner. Terms "include", "contain", "have", and other variants thereof all mean "include but are not limited to", unless otherwise specifically emphasized in another manner.

In this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B may be singular or plural. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The following describes some technical terms in this application.

1. A frequency baseline is a frequency of one frequency point minus a frequency of another frequency point. The frequency baseline has a direction and a magnitude. For two frequency points whose frequencies are $f_i$ and $f_j$, the two frequency points may form a pair of frequency baselines, which are separately a frequency baseline $b_{ij}=f_i-f_j$ and a frequency baseline $b_{ij}=f_j-f_i$.

A communication system to which the technical solutions of this application are applicable includes but is not limited to a long term evolution (LTE) system, a 5th generation (5G) mobile communication system, a mobile communication system (for example, a 6G mobile communication system) after a 5G network, a device-to-device (D2D) communication system, or a vehicle-to-everything (V2X) communication system.

In embodiments of this application, the communication system includes a first communication apparatus. When performing communication, the first communication apparatus sends a sensing signal, to implement sensing of a surrounding environment.

In a possible implementation, the first communication apparatus is a communication apparatus that has both a sensing capability and a communication capability. The first communication apparatus determines a first frequency domain resource, and sends the sensing signal on the first frequency domain resource. The first frequency domain resource is determined from a frequency domain resource pool based on a sensing requirement parameter. The sensing signal is reflected to the first communication apparatus through a sensing target in the surrounding environment, and the first communication apparatus receives the sensing signal reflected by the sensing target. In this way, the first communication apparatus may perform sensing measurement on the sensing signal, to obtain a sensing result. For example, the first communication apparatus determines a distance between the sensing target and the first communication apparatus.

In another possible implementation, the communication system further includes a second communication apparatus. The first communication apparatus determines a first frequency domain resource, and sends the sensing signal on the first frequency domain resource. The first frequency domain resource is determined from a frequency domain resource pool based on a sensing requirement parameter. The sensing signal is reflected back by a sensing target in the surrounding environment, and the second communication apparatus receives the sensing signal reflected by the sensing target. Then, the second communication apparatus performs sensing measurement on the sensing signal, to obtain a sensing result. For example, the first communication apparatus determines a distance between the sensing target and the first communication apparatus.

In this implementation, optionally, the communication system further includes a third communication apparatus. The third communication apparatus may indicate the first communication apparatus to send the sensing signal. The third communication apparatus may indicate the second communication apparatus to enable a sensing function.

In the foregoing two possible implementations, the frequency domain resource pool may include a frequency domain resource used for communication and a frequency domain resource used for positioning. This is not specifically limited in this application. The first frequency domain resource is a frequency domain resource selected from the frequency domain resource pool.

In embodiments of this application, the first communication apparatus and the second communication apparatus may be radar devices, vehicle-mounted devices, network devices, terminal devices, or the like. The third communication apparatus is a network device.

The network device is an apparatus that is deployed in a radio access network and that provides a wireless communication function for the terminal device. The network device may be a base station, and the base station includes a macro base station, a micro base station, a relay station, and an access point in various forms. For example, the base station in embodiments of this application may be a base station, a transmission reception point (TRP), a transmission point (TP), or a next generation NodeB (ngNB) in a new radio (NR) system, or may be an evolved NodeB (eNB or eNodeB) in a long term evolution (LTE) system.

The terminal device may be a device that provides voice or data connectivity for a user. The terminal device is also referred to as user equipment (UE), or may be referred to as a mobile station, a subscriber unit, a station, terminal equipment (TE), or the like. The terminal device may be a cellular phone, a personal digital assistant (PDA), a wireless modem, a handheld device, a laptop computer, a cordless phone, a wireless local loop (WLL) station, a tablet computer (pad), a vehicle-mounted device, a wearable device, a computing device, an unmanned aerial vehicle, or the like. With development of wireless communication technologies, a device that can access a communication system, communicate with a network side of a communication system, or communicate with another object through a communication system may be the terminal device in embodiments of this application. For example, the terminal device may be a terminal device or a vehicle in intelligent transportation, a household device in a smart home, an electric meter reading instrument, a voltage monitoring instrument, or an environment monitoring instrument in a smart grid, a video surveillance instrument or a cash register in an intelligent security network, or the like.

The following describes some application scenarios to which embodiments of this application are applicable. It should be noted that the following application scenarios are merely examples, and are not intended to limit the technical solutions of this application. This application is also applicable to another application scenario.

FIG. 1A is a schematic diagram of an application scenario according to an embodiment of this application. FIG. 1A shows a specific example of a case in which the first communication apparatus in the communication system serves as both a transmit end of the sensing signal and a receive end of the sensing signal.

In FIG. 1A, the first communication apparatus is a network device 1. The network device 1 may select the first frequency domain resource from a frequency domain resource that is of the network device 1 and that is for communication. When the network device 1 performs communication, the network device 1 sends the sensing signal on the first frequency domain resource. The sensing signal is reflected to the network device 1 through a vehicle in the surrounding environment. In this way, the network device 1 may perform sensing measurement on the sensing signal, to obtain a sensing result. For example, the network device 1 may perform sensing measurement on the sensing signal, to obtain a distance between the network device 1 and the vehicle, a speed of the vehicle, and the like.

With reference to FIG. 1B to FIG. 1F, the following describes some specific examples of a case in which the first communication apparatus is a transmit end of the sensing signal, and the second communication apparatus is a receive end of the sensing signal.

FIG. 1B is a schematic diagram of another application scenario according to an embodiment of this application. The first communication apparatus is a network device 1, and the second communication apparatus is a terminal device. The terminal device accesses the network device 1. The network device 1 may communicate with the terminal device. When the network device 1 communicates with the terminal device, the network device 1 sends the sensing signal on the first frequency domain resource. For example, the first frequency domain resource may be determined from a frequency domain resource used to transmit a downlink signal between the network device 1 and the terminal device. Then, the sensing signal is reflected to the terminal device through a vehicle in the surrounding environment. The terminal device may sense the sensing signal, to obtain a sensing result. In this way, the terminal device implements sensing of the vehicle in the surrounding environment while performing communication.

Figures 1C, 1D:
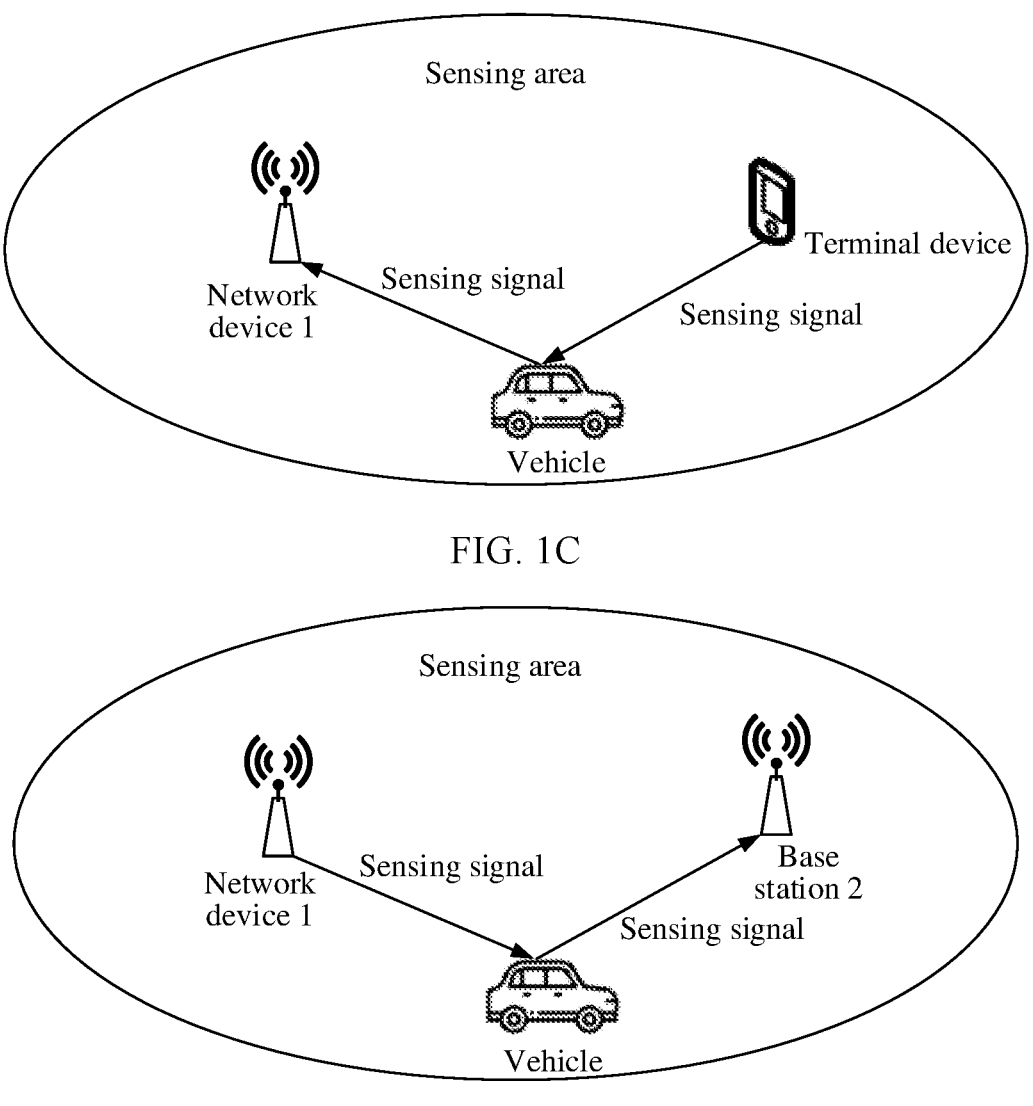
FIG. 1C is a schematic diagram of another application scenario according to an embodiment of this application.
FIG. 1D is a schematic diagram of another application scenario according to an embodiment of this application.

FIG. 1C is a schematic diagram of another application scenario according to an embodiment of this application. The first communication apparatus is a terminal device, and the second communication apparatus is a network device 1. The terminal device accesses the network device 1, and the terminal device may communicate with the network device 1. When the terminal device 1 communicates with the network device 1, the terminal device sends the sensing signal on the first frequency domain resource. For example, the first frequency domain resource may be determined from a frequency domain resource used to transmit an uplink signal between the terminal device and the network device 1. The sensing signal is reflected to the network device 1 through a vehicle in the surrounding environment. The network device 1 may sense the sensing signal, to obtain a sensing result. In this way, the network device 1 implements sensing of the vehicle in the surrounding environment while performing communication.

FIG. 1D is a schematic diagram of another application scenario according to an embodiment of this application. The first communication apparatus is a network device 1, and the second communication apparatus is a network device 2. The network device 1 may communicate with the network device 2. When the network device 1 communicates with the network device 2, the network device 1 sends the sensing signal on the first frequency domain resource. The first frequency domain resource may be determined from a frequency domain resource used for communication between the network device 1 and the network device 2. The sensing signal is reflected to the network device 2 through a vehicle in the surrounding environment. The network device 2 may sense the sensing signal, to obtain a sensing result. In this way, the network device 2 implements sensing of the vehicle in the surrounding environment while performing communication.

Figures 1E, 1F:
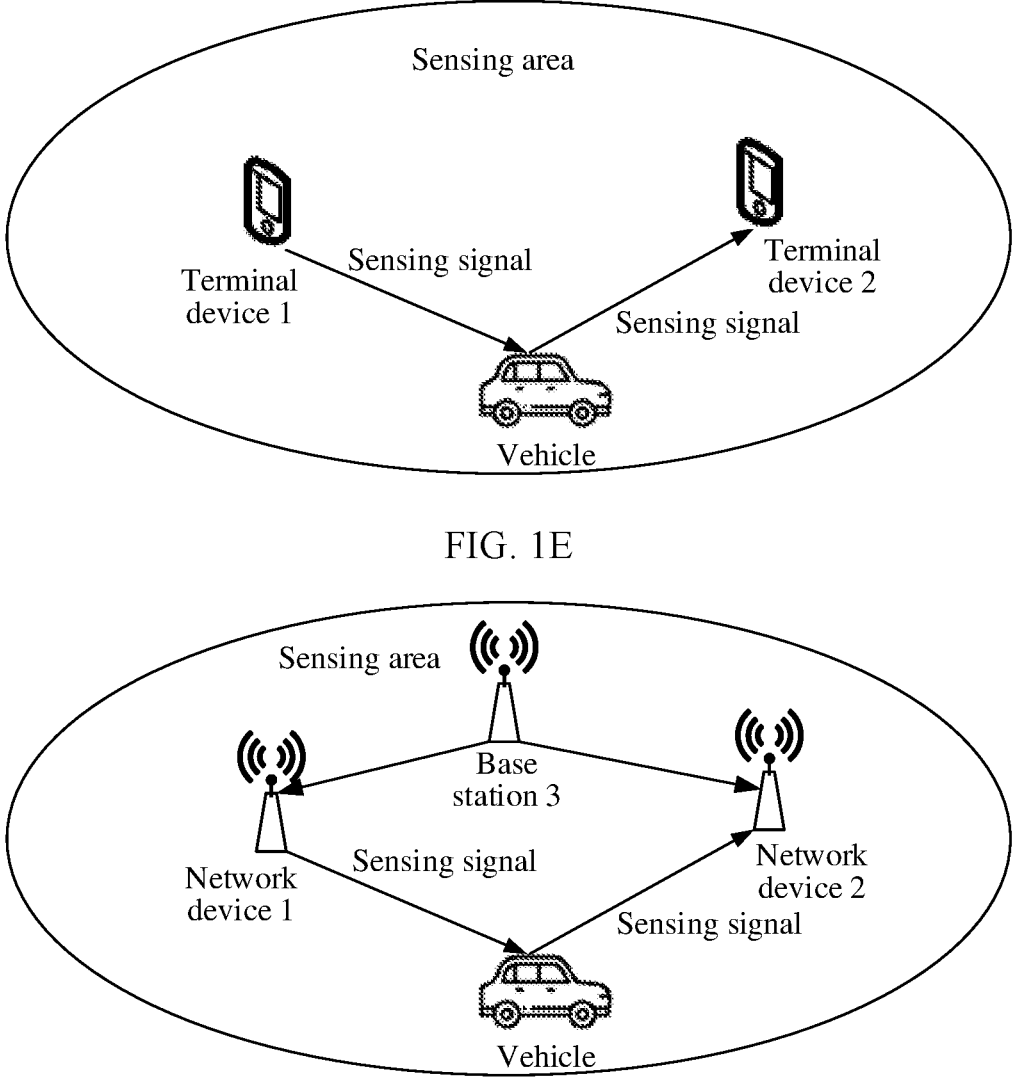
FIG. 1E is a schematic diagram of another application scenario according to an embodiment of this application.
FIG. 1F is a schematic diagram of another application scenario according to an embodiment of this application.

FIG. 1E is a schematic diagram of another application scenario according to an embodiment of this application. The first communication apparatus is a terminal device 1, and the second communication apparatus is a terminal device 2. The terminal device 1 may communicate with the terminal device 2. When the terminal device 1 communicates with the terminal device 2, the terminal device 1 may send the sensing signal on the first frequency domain resource. For example, the first frequency domain resource may be determined from a frequency domain resource used for communication between the terminal device 1 and the terminal device 2. The sensing signal is reflected to the terminal device 2 through a vehicle in the surrounding environment. The terminal device 2 senses the sensing signal, to obtain a sensing result. The application scenario shown in FIG. 1E may be applied to a V2X system or a D2D system.

FIG. 1F is a schematic diagram of another application scenario according to an embodiment of this application. In FIG. 1F, the first communication apparatus is a network device 1, the second communication apparatus is a network device 2, and the third communication apparatus is a network device 3. The network device 1 may communicate with the network device 2. The network device 3 serves as a control node, and is configured to notify the network device 1 and the network device 2. For example, the network device 3 may trigger the network device 1 to send the sensing signal, and trigger the network device 2 to enable a sensing function. The network device 1 may send the sensing signal on the first frequency domain resource. The first frequency domain resource may be determined from a frequency domain resource used for communication between the network device 1 and the network device 2. The sensing signal is reflected to the network device 2 through a vehicle in the surrounding environment. The network device 2 may sense the sensing signal, to obtain a sensing result. In this way, the network device 2 implements sensing of the surrounding environment while performing communication.

The following describes the technical solutions of this application with reference to specific embodiments.

Figure 2A:
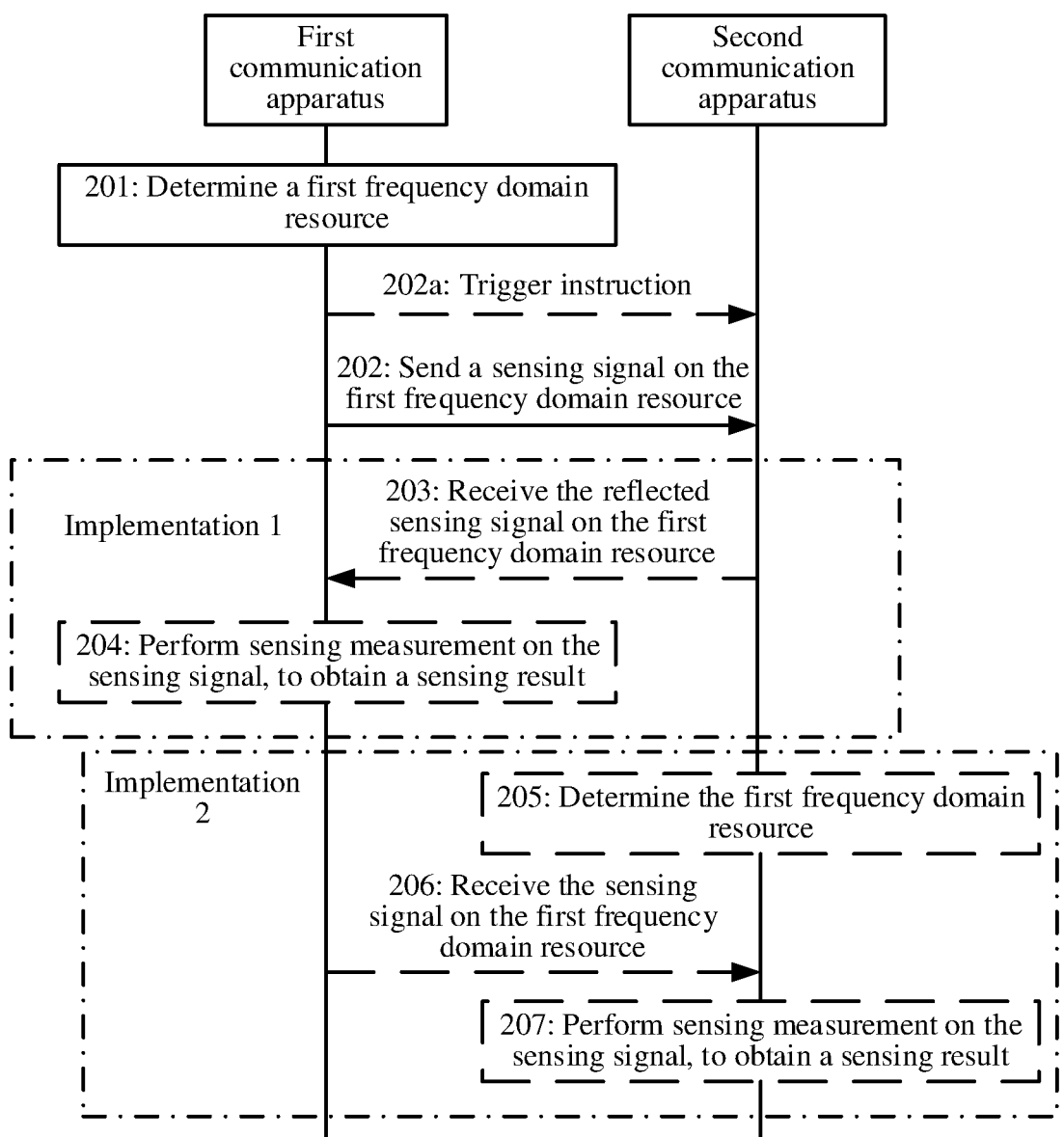
FIG. 2A is a schematic interaction diagram of a communication method according to an embodiment of this application.

FIG. 2A is a schematic diagram of another embodiment of a communication method according to an embodiment of this application. In FIG. 2A, the communication method includes the following steps.

201: A first communication apparatus determines a first frequency domain resource.

The first frequency domain resource is determined from a frequency domain resource pool based on a sensing requirement parameter. In this embodiment, the frequency domain resource pool includes an available frequency domain resource configured for the first communication apparatus. For example, the frequency domain resource pool includes a frequency domain resource used for communication and/or a frequency domain resource used for positioning. The first frequency domain resource may be determined from the frequency domain resource used for communication and/or the frequency domain resource used for positioning.

Optionally, the frequency domain resource pool includes a frequency domain resource used to transmit a channel state information (CSI) reference signal between the first communication apparatus and a second communication apparatus. Alternatively, the frequency domain resource pool includes a frequency domain resource used to transmit communication data between the first communication apparatus and a second communication apparatus. In other words, the first frequency domain resource in this application may be a frequency domain resource determined from the frequency domain resource that is of the first communication apparatus and that is used to transmit the CSI and/or the frequency domain resource that is of the first communication apparatus and that is used to transmit the communication data.

Optionally, the first frequency domain resource includes a frequency point combination or a frequency band combination.

The frequency point combination includes one or more frequency points. The frequency band combination includes one or more frequency bands.

For example, the frequency point combination includes a frequency point 0, a frequency point 2, a frequency point 4, and a frequency point 6. A frequency of the frequency point 0 is $f_0$, a frequency of the frequency point 2 is $f_2$, a frequency of the frequency point 4 is $f_4$, and a frequency of the frequency point 6 is $f_6$.

For example, the frequency band combination includes a frequency band between a frequency $f_0$ and a frequency $f_6$.

In this embodiment, the sensing requirement parameter is used by the first communication apparatus or the second communication apparatus to perform sensing measurement by using a sensing signal. For example, the sensing requirement parameter may represent a requirement for performing sensing ranging by using a sensing signal.

Optionally, the sensing requirement parameter includes at least one of the following: an unambiguous ranging distance or a ranging resolution.

Specifically, the unambiguous ranging distance and the ranging resolution represent requirements for performing sensing ranging by using the sensing signal.

In this embodiment, the ranging resolution refers to a minimum distance for distinguishing between two same target points in terms of a distance.

The two same target points may be two target points that have a same size, volume, material, and the like.

A smaller ranging resolution requires a shorter minimum distance for the first communication apparatus to distinguish between the two same target points. In other words, the smaller ranging resolution requires higher sensing accuracy.

Figures 2B, 2C:
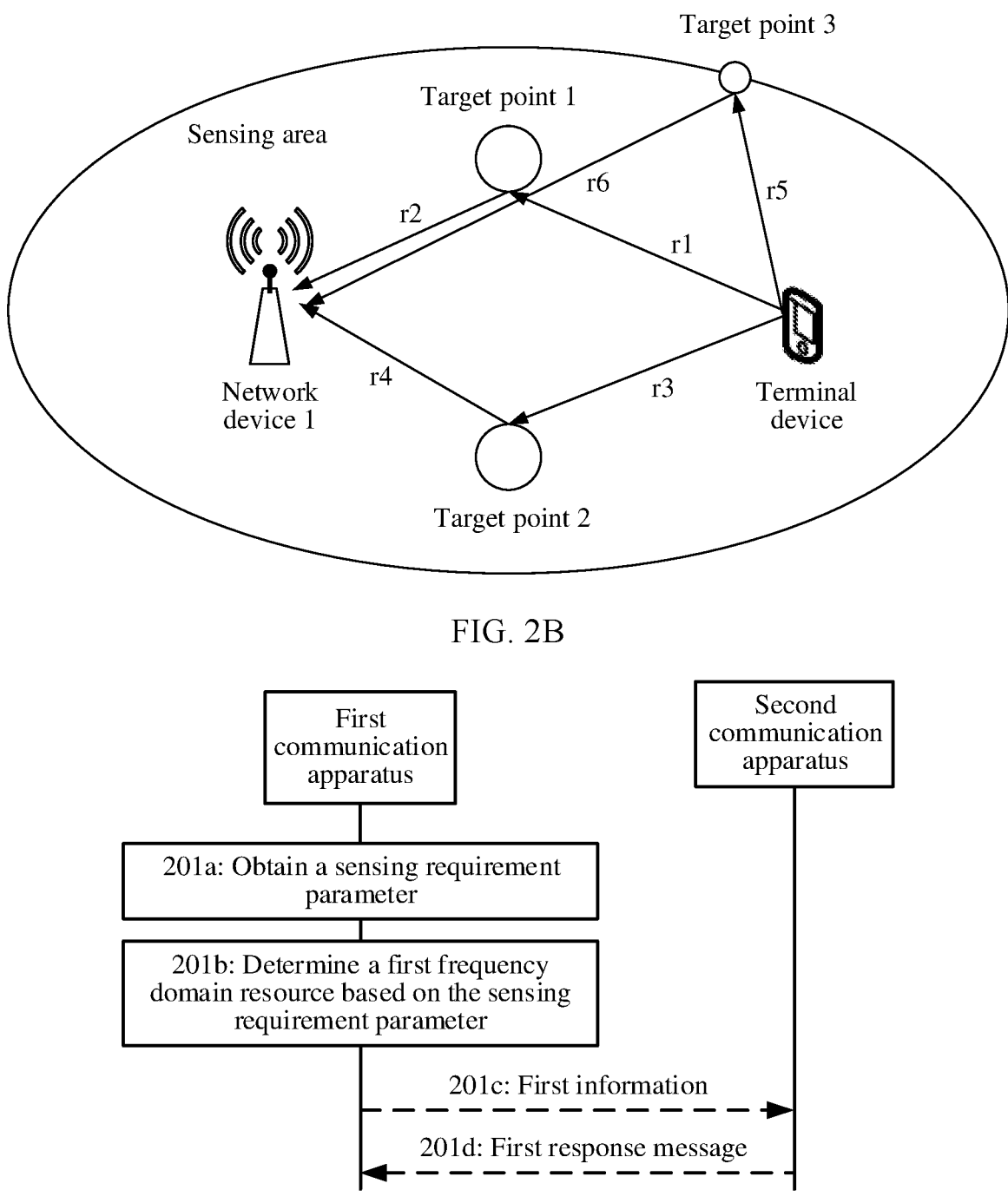
FIG. 2B is a schematic diagram of another application scenario according to an embodiment of this application.
FIG. 2C is another schematic interaction diagram of a communication method according to an embodiment of this application.

For example, as shown in FIG. 2B, a terminal device sends a sensing signal on a first frequency domain resource. The sensing signal is reflected to a network device 1 separately through a target point 1 and a target point 2. A sum of a distance from the terminal device to the target point 1 and a distance from the target point 1 to the network device 1 is r1+r2. A sum of a distance from the terminal device to the target point 2 and a distance from the target point 2 to the network device 1 is r3+r4. A ranging resolution is Δr. If |(r3+r4)−(r1+r2)| is greater than or equal to Δr, the network device 1 may distinguish between the target point 1 and the target point 2. If |(r3+r4)−(r1+r2)| is less than Δr, the network device 1 may be unable to distinguish between the target point 1 and the target point 2, and the network device 1 considers that there is only one target point.

It should be noted that the ranging resolution is proportional to bandwidth of the sensing signal. Larger bandwidth of the sensing signal indicates a higher ranging resolution.

In this embodiment, optionally, for a case in which the first communication apparatus serves as a transmit end and a receive end of the sensing signal, the unambiguous ranging distance indicates the following requirement: A distance from any point in a sensing area to the first communication apparatus multiplied by 2 is less than the unambiguous ranging distance, and a distance from any point on an edge of the sensing area to the first communication apparatus multiplied by 2 is equal to the unambiguous ranging distance.

For example, as shown in FIG. 1A, a sensing area is a circular area shown in FIG. 1A, and a network device 1 is a center of a circle. An unambiguous ranging distance is $r_{max}$. Twice a distance from any point on the circle to the network device 1 is equal to the unambiguous ranging distance $r_{max}$. A vehicle is located in the circular area, and a distance from the network device 1 to the vehicle is R1. For the vehicle in the circular area in FIG. 1A, a value obtained by multiplying the distance R1 from the network device 1 to the vehicle by 2 is less than $r_{max}$. For a target point on the circle in FIG. 1A, a distance from the target point to the network device 1 is R2, and a value obtained by multiplying the distance R2 from the target point to the network device 1 by 2 is equal to $r_{max}$.

In this embodiment, optionally, for a case in which the first communication apparatus serves as a transmit end of the sensing signal, and the second communication apparatus serves as a receive end of the sensing signal, the unambiguous ranging distance indicates the following requirement: A sum of a distance from any point in a sensing area to the first communication apparatus and a distance from the point to the second communication apparatus is less than the unambiguous ranging distance, and a sum of a distance from any point on an edge of the sensing area to the first communication apparatus and a distance from the point to the second communication apparatus is equal to the unambiguous ranging distance.

For example, as shown in FIG. 2B, a sensing area is an elliptical area shown in FIG. 2B, and a network device 1 and a terminal device are two focuses of an ellipse. An unambiguous ranging distance is $r_{max}$, and a sum of a distance from any point on the ellipse to the network device 1 and a distance from the point to the terminal device is equal to the unambiguous ranging distance $r_{max}$. A target point 1 and a target point 2 are located in the elliptical area, and a target point 3 is located on the ellipse. The terminal device sends a sensing signal on a first frequency domain resource. The sensing signal is reflected to the network device 1 separately through the target point 1 and the target point 2. For the target point 1 located in the elliptical area, a sum of a distance from the terminal device to the target point 1 and a distance from the target point 1 to the network device 1 is r1+r2, and r1+r2 is less than $r_{max}$. For the target point 3 located on the ellipse, a sum of a distance from the terminal device to the target point 3 and a distance from the target point 3 to the network device 1 is r5+r6, and r5+r6 is equal to $r_{max}$.

The following describes the first frequency domain resource with reference to specific content included in the sensing requirement parameter.

In a first possible implementation, the sensing requirement parameter includes the unambiguous ranging distance, the first frequency domain resource meets a minimum frequency baseline, and the minimum frequency baseline is determined based on the unambiguous ranging distance.

First, an example in which the first frequency domain resource includes a frequency point combination is used for description. The unambiguous ranging distance is $r_{max}$, so that a length of the minimum frequency baseline is $$|b_{min}| = \frac{c}{r_{max}},$$

where c is a propagation speed of light under a standard atmosphere condition. If frequency baselines formed by frequency points included in the frequency point combination include a frequency baseline with a length less than or equal to $|b_{min}|$, it may be considered that the frequency point combination meets the minimum frequency baseline.

For example, the frequency point combination includes a frequency point 0, a frequency point 2, a frequency point 4, and a frequency point 6. In the frequency point combination, frequency points are arranged in ascending order of frequencies. A frequency of the frequency point 0 is $f_0$, a frequency of the frequency point 2 is $f_2$, a frequency of the frequency point 4 is $f_4$, and a frequency of the frequency point 6 is $f_6$.

The unambiguous ranging distance is $r_{max}$, so that the length of the minimum frequency baseline is $$|b_{min}| = \frac{c}{r_{max}}.$$

In frequency baselines formed by two different frequency points in the frequency point combination, a length of a frequency baseline formed by the frequency point 0 and the frequency point 2 is $|f_0-f_2|$, where $|f_0-f_2|$ is equal to $|b_{min}|$. In this case, it may be understood that the frequency point combination meets the minimum frequency baseline.

From a perspective of independently using a frequency point resource by a single device, when the frequency baselines formed by the frequency points in the frequency point combination include the frequency baseline whose length is less than or equal to $|b_{min}|$, the frequency point combination can also meet a requirement of the minimum frequency baseline, but a waste of frequency point resources may be caused. Therefore, in the frequency baselines formed by the frequency points in the frequency point combination, as long as a length of a frequency baseline with a smallest length is $|b_{min}|$, the requirement of the minimum frequency baseline can be met, and the waste of frequency point resources can also be avoided.

From a perspective of sharing a frequency point resource by a plurality of devices, a frequency point reuse rate may be considered for selecting the frequency points included in the frequency point combination, to improve resource utilization, and save frequency point resources.

For example, when a frequency point combination determined by a device 1 includes a frequency point 0 and a frequency point 1, a frequency of the frequency point 0 is $f_0$, a frequency of the frequency point 1 is $f_1$, $|f_0-f_1|$ is equal to a length of a minimum frequency baseline required by the device 1, and $|f_0-f_1|$ is less than a length of a minimum frequency baseline required by a device 2, the device 2 may select the frequency point 0 and the frequency point 1. In this way, frequency point resource utilization of the frequency point 0 and the frequency point 1 can be improved, and frequency point resources can be saved.

For example, the unambiguous ranging distance $r_{max}=100$ m. In this case, it may be determined according to the formula $$|b_{min}| = \frac{c}{r_{max}}$$

that the length of the minimum frequency baseline is required to be 3 megahertz (MHz). The frequency domain resource pool includes a 3.5 gigahertz (GHz) frequency band, and is represented by $\{f(a)|f(a)=3.5*10^9+a*15*10^3, 0 \le a \le 1000\}$, where a unit of f(a) is hertz (Hz). In this case, a smallest frequency point is 3.5 GHz, and a largest frequency point is 3.515 GHz. Other frequency points are selected from f(a) at an interval of 15 kHz, to obtain a frequency point combination 1. Then, frequency points are selected from the frequency point combination 1, to obtain a frequency point combination 2. The frequency point combination 2 is specifically represented by $\{f(m)|f(m)=3.5*10^9+m*15*10^3, m=0, 200, 400, 600, 800, 1000\}$, where a unit of f(m) is hertz (Hz). The frequency point combination 2 is used as the first frequency domain resource. In frequency baselines formed by two different frequency points in the frequency point combination 2, a length of a frequency baseline formed by the frequency point 3.5 GHz and a frequency point 3.503 GHz is 3 MHz. Therefore, it may be understood that the frequency point combination 2 meets the minimum frequency baseline.

In a second possible implementation, the sensing requirement parameter includes the ranging resolution, the first frequency domain resource meets a maximum frequency baseline, and the maximum frequency baseline is determined based on the ranging resolution.

First, an example in which the first frequency domain resource includes a frequency point combination is used for description. The ranging resolution is $\Delta r$, so that it can be learned that a length of the maximum frequency baseline is $$|b_{max}| = \frac{c}{\Delta r},$$

where c is a propagation speed of light under a standard atmosphere condition. If frequency baselines formed by frequency points included in the frequency point combination include a frequency baseline with a length greater than or equal to $|b_{max}|$, it may be considered that the frequency point combination meets the maximum frequency baseline.

For example, the frequency point combination includes a frequency point 0, a frequency point 2, a frequency point 4, and a frequency point 6. In the frequency point combination, frequency points are arranged in ascending order of frequencies. A frequency of the frequency point 0 is $f_0$, a frequency of the frequency point 2 is $f_2$, a frequency of the frequency point 4 is $f_4$, and a frequency of the frequency point 6 is $f_6$.

The ranging resolution is $\Delta r$, so that the length of the maximum frequency baseline is $$|b_{max}| = \frac{c}{\Delta r}.$$

In frequency baselines formed by two different frequency points in the frequency point combination, a length of a frequency baseline formed by the frequency point 0 and the frequency point 6 is $|f_0-f_6|$, where $|f_0-f_6|$ is equal to $|b_{max}|$. In this case, it may be understood that the frequency point combination meets the maximum frequency baseline.

From a perspective of independently using a frequency point resource by a single device, when the frequency baselines formed by the frequency points in the frequency point combination include the frequency baseline whose length is greater than or equal to $|b_{max}|$, the frequency point combination can also meet a requirement of the maximum frequency baseline, but a waste of frequency point resources may be caused. Therefore, in the frequency baselines formed by the frequency points in the frequency point combination, as long as a length of a frequency baseline with a largest length is $|b_{max}|$, the requirement of the maximum frequency baseline can be met, and the waste of frequency point resources can also be avoided.

From a perspective of sharing a frequency point resource by a plurality of devices, a frequency point reuse rate may be considered for selecting the frequency points included in the frequency point combination, to improve resource utilization, and save frequency point resources. For example, when a frequency point combination determined by a device 1 includes a frequency point 0, a frequency point 2, a frequency point 4, and a frequency point 7, the frequency points in the frequency point combination are arranged in ascending order of frequencies, $|f_0-f_7|$ is equal to a length of a maximum frequency baseline required by the device 1, and $|f_0-f_7|$ is greater than a length of a maximum frequency baseline required by a device 2, the device 1 determines that the frequency point combination meets the maximum frequency baseline required by the device 1, and the device 2 may select the frequency point 0, the frequency point 2, the frequency point 4, and the frequency point 7. In this way, frequency point resource utilization of the frequency point 0, the frequency point 2, the frequency point 4, and the frequency point 7 can be improved, and frequency point resources can be saved.

For example, the ranging resolution is $\Delta r=10$ meters (m). In this case, it may be determined according to the formula $$|b_{max}| = \frac{c}{\Delta r}$$

that the length of the maximum frequency baseline is required to be 30 MHz. The frequency domain resource pool includes a 3.5 GHz frequency band, and is represented by $\{f(i)|f(i)=3.5*10^9+i*15*10^3, 0\leq i\leq 2000\}$, where a unit of f(i) is Hz. In this case, a smallest frequency point is 3.5 GHz, and a largest frequency point is 3.53 GHz. Other frequency points are selected from f(i) at an interval of 15 kHz, to obtain a frequency point combination 3. Then, frequency points are selected from the frequency point combination 3, to obtain a frequency point combination 4. The frequency point combination 4 is specifically represented by $\{f(n)|f(n)=3.5*10^9+n*15*10^3$, n=0, 200, 400, 600, 800, 1000, 1200, 1400, 1600, 1800, 2000$\}$, where a unit of f(n) is Hz. In frequency baselines formed by two different frequency points in the frequency point combination 4, a length of a frequency baseline formed by the frequency point 3.5 GHz and the frequency point 3.53 GHz is 30 MHz. Therefore, the frequency point combination 4 meets the maximum frequency baseline.

An example in which the first frequency domain resource includes a frequency band combination is used below for description. The frequency band combination includes one or more frequency bands. The ranging resolution is $\Delta r$, so that it can be learned that a length of the maximum frequency baseline is $$|b_{max}| = \frac{c}{\Delta r},$$

where c is a propagation speed of light under a standard atmosphere condition. If frequency baselines formed by the frequency band included in the frequency band combination include a frequency baseline with a length greater than or equal to $|b_{max}|$, it may be considered that the frequency band combination meets the maximum frequency baseline.

For example, the frequency band combination includes a frequency band with frequencies from $f_0$ to $f_3$, and a frequency band with frequencies from $f_6$ to $f_9$. $f_0$ is less than $f_3$, $f_3$ is less than $f_6$, and $f_6$ is less than $f_9$. A smallest frequency is $f_0$, and a largest frequency is $f_9$. In this case, a length of a frequency baseline with a largest length in frequency baselines formed by frequency bands included in the frequency band combination is $|f_0-f_9|$. If $|f_0-f_9|$ is greater than or equal to $|b_{max}|$, it may be considered that the frequency band combination meets the maximum frequency baseline.

In a third possible implementation, the sensing requirement parameter includes the unambiguous ranging distance and the ranging resolution, and the first frequency domain resource meets a minimum frequency baseline and a maximum frequency baseline.

The minimum frequency baseline is determined based on the unambiguous ranging distance. The maximum frequency baseline is determined based on the ranging resolution.

An example in which the first frequency domain resource includes a frequency point combination is used herein for description. The unambiguous ranging distance is $r_{max}$, and the ranging resolution is $\Delta r$. Therefore, a length of the minimum frequency baseline is $$|b_{min}| = \frac{c}{r_{max}},$$

and a length of the maximum frequency baseline is $$|b_{max}| = \frac{c}{\Delta r}.$$

If frequency baselines formed by frequency points included in the frequency point combination includes a frequency baseline with a length less than or equal to $|b_{min}|$ and a frequency baseline with a length greater than or equal to $|b_{max}|$, it may be considered that the frequency point combination meets the maximum frequency baseline and the minimum frequency baseline.

For example, the frequency point combination includes a frequency point 0, a frequency point 2, a frequency point 4, and a frequency point 6. In the frequency point combination, frequency points are arranged in ascending order of frequencies. A frequency of the frequency point 0 is $f_0$, a frequency of the frequency point 2 is $f_2$, a frequency of the frequency point 4 is $f_4$, and a frequency of the frequency point 6 is $f_6$.

In frequency baselines formed by two different frequency points in the frequency point combination, a length of a frequency baseline formed by the frequency point 0 and the frequency point 2 is $|f_0-f_2|$, and a length of a frequency baseline formed by the frequency point 0 and the frequency point 6 is $|f_0-f_6|$. If $|f_0-f_2|$ is less than or equal to $|b_{min}|$, it may be understood that the frequency point combination meets the minimum frequency baseline. If $|f_0-f_6|$ is greater than or equal to $|b_{max}|$, it may be understood that the frequency point combination meets the maximum frequency baseline. In other words, the frequency point combination meets both the minimum frequency baseline and the maximum frequency baseline.

For example, the unambiguous ranging distance $r_{max}=100$ m. In this case, it may be determined according to the formula $$|b_{min}| = \frac{c}{r_{max}}$$

that the length of the minimum frequency baseline is required to be 3 MHz. The ranging resolution is $\Delta r=10$ m. In this case, it may be determined according to the formula $$|b_{max}| = \frac{c}{\Delta r}$$

that the length of the maximum frequency baseline is required to be 30 MHz. The frequency domain resource pool includes a 3.5 gigahertz (GHz) frequency band, and is represented by $\{f(i)|f(i)=3.5*10^9+i*15*10^3, \ 0 \leq i \leq 2000\}$, where a unit of f(i) is Hz. In this case, a smallest frequency point is 3.5 GHz, and a largest frequency point is 3.53 GHz. Other frequency points are selected from f(i) at an interval of 15 kHz, to obtain a frequency point combination 5. Then, frequency points are selected from the frequency point combination 5, to obtain a frequency point combination 6. The frequency point combination 6 is specifically represented by $\{f(n)|f(n)=3.5*10^9+n*15*10^3, n=0, 200, 400, 600, 800, 1000, 1200, 1400, 1600, 1800, 2000\}$, where a unit of f(n) is Hz. In frequency baselines formed by two different frequency points in the frequency point combination 6, a length of a frequency baseline formed by the frequency point 3.5 GHz and a frequency point 3.503 GHz is 3 MHz. Therefore, the frequency point combination 6 meets the minimum frequency baseline. A length of a frequency baseline formed by the frequency point 3.5 GHz and the frequency point 3.53 GHz is 30 MHz. Therefore, the frequency point combination 6 meets the maximum frequency baseline. In other words, the frequency point combination 6 meets both the minimum frequency baseline and the maximum frequency baseline.

In the third possible implementation, optionally, the first frequency domain resource includes a frequency point combination, and the frequency point combination is a frequency point combination that meets a first condition.

The first condition includes: Frequency baselines formed by frequency points included in the frequency point combination include a frequency baseline of a first length. The first length is k*length of the minimum frequency baseline, k is a positive integer belonging to [1, K], K is a ratio of a length of the maximum frequency baseline to the length of the minimum frequency baseline, and K is greater than 1.

For example, frequencies of the frequency points included in the frequency point combination are separately 0, 1, 4, and 6. It can be learned that, in the frequency baselines formed by the frequency points included in the frequency point combination, a frequency baseline with a smallest length is 1, and a frequency baseline with a largest length is 6. The ratio of the length of the maximum frequency baseline to the length of the minimum frequency baseline is 6. The frequency baselines that may be formed by the frequency point combination include frequency baselines whose frequencies are separately −6, −5, −4, −3, −2, −1, 0, 1, 2, 3, 4, 5, and 6. It may be understood that the frequency point combination meets a requirement of frequency baseline coverage integrity.

It can be learned from the foregoing descriptions that the length of the maximum frequency baseline is $|b_{max}|$, and the length of the minimum frequency baseline is $|b_{min}|$. It can be learned that $K=|b_{max}|/|b_{min}|$. If all frequency baselines whose lengths are $k|b_{min}|$ can be formed by the frequency points included in the frequency point combination, the frequency baselines formed by the frequency points included in the frequency point combination have complete frequency coverage, in other words, the frequency baseline coverage integrity is ensured. In this way, sensing ranging can be performed on a plurality of target points in a surrounding environment.

For example, when the frequency point combination can form only one frequency baseline $d_1$, the following relationship $y_1=f(d_1, \tau_1)$ is obtained. $d_1$ represents the frequency baseline, $\tau_1$ is a delay, $y_1$ is a measurement result corresponding to the frequency baseline $d_1$, and f is a mapping relationship for obtaining $y_1$ based on the frequency baseline $d_1$ and the delay $\tau_1$. The delay $\tau_1$ is unknown. In other words, one equation corresponds to one unknown number. The delay $\tau_1$ may be understood as a delay in which sensing signals at two frequency points that form the frequency baseline $d_1$ arrive at a target point 1 and then are reflected.

However, when both the delay $\tau_1$ and a delay $\tau_2$ exist, the following relationship $y_1=f_1(d_1, \tau_1, \tau_2)$ is obtained. The delay $\tau_1$ and the delay $\tau_2$ are unknown. In this case, one equation corresponds to two unknown numbers, and the equation cannot be solved. The delay $\tau_2$ may be understood as a delay in which sensing signals at two frequency points that form the frequency baseline $d_1$ arrive at a target point 2 and then are reflected. However, if the frequency point combination further forms another frequency baseline $d_2$, another equation $y_2=f_2(d_2, \tau_1, \tau_2)$ may be obtained. In this way, the frequency baseline $d_1$ and the frequency baseline $d_2$ separately correspond to two equations, and the two unknown numbers, that is, the delay $\tau_1$ and the delay $\tau_2$, may be solved. Then, position information of the target point 1 and the target point 2 may be determined with reference to the delay $\tau_1$ and the delay $\tau_2$. Therefore, if the frequency baselines formed by the frequency points included in the frequency point combination have complete frequency coverage, sensing and ranging can be implemented on a plurality of target points in the surrounding environment.

In the third possible implementation, optionally, the first frequency domain resource includes a frequency band combination, and the frequency band combination is a frequency band combination that meets a second condition.

The second condition includes: Frequency baselines formed by a frequency band included in the frequency band combination include a frequency baseline of a second length. The second length is k*a length of the minimum frequency baseline, k is a positive integer in [1, K], K is a length of the maximum frequency baseline, and K is greater than 1.

For example, the frequency band combination includes a frequency band with frequencies from $f_0$ to $f_3$, and a frequency band with frequencies from $f_6$ to $f_9$. If frequency baselines formed by selected frequency points in the frequency band combination include the frequency baseline of the second length, it is considered that the frequency baselines formed by the selected frequency points in the frequency band combination have complete frequency coverage.

In this embodiment, optionally, the first frequency domain resource includes a frequency point combination. The frequency point combination includes a subcarrier combination. The subcarrier combination is a subcarrier combination with a smallest quantity of subcarriers in a subcarrier combination that meets the minimum frequency baseline, the maximum frequency baseline, and the first condition.

Specifically, there may be a plurality of subcarrier combinations that meet the minimum frequency baseline, the maximum frequency baseline, and the first condition. In this case, the subcarrier combination may be a subcarrier combination with a smallest quantity of subcarriers in the plurality of subcarrier combinations. In this way, the subcarrier combination with the smallest quantity of subcarriers is selected under a condition that the maximum frequency baseline and the minimum frequency baseline are met and complete frequency baseline coverage is ensured, so that subcarrier overheads in frequency domain are effectively reduced. This avoids occupying excessive communication resources and affecting communication performance.

For a specific implementation of determining the first frequency domain resource by the first communication apparatus in step 201, refer to related descriptions in FIG. 2C and FIG. 2D in the following descriptions. Details are not described herein.

202: The first communication apparatus sends the sensing signal on the first frequency domain resource.

For example, the first frequency domain resource includes a frequency point 0, a frequency point 2, a frequency point 4, and a frequency point 6. A frequency of the frequency point 0 is $f_0$, a frequency of the frequency point 2 is $f_2$, a frequency of the frequency point 4 is $f_4$, and a frequency of the frequency point 6 is $f_6$. In this case, the first communication apparatus separately sends sensing signals on frequency points whose frequencies are separately $f_0$, $f_2$, $f_4$, and $f_6$.

For example, the first frequency domain resource includes a frequency band between a frequency $f_0$ and a frequency $f_6$. The first communication apparatus is a radar device, and the radar device sends a frequency modulated continuous wave (FMCW) signal on the frequency band between the frequency $f_0$ and the frequency $f_6$.

In this embodiment of this application, in the embodiment shown in FIG. 2A, before the second communication apparatus performs sensing measurement on the sensing signal, the second communication apparatus enables a sensing function.

Optionally, the second communication apparatus may periodically enable the sensing function or may always enable the sensing function, or the first communication apparatus or a third communication apparatus may trigger the second communication apparatus to enable the sensing function. Optionally, the embodiment shown in FIG. 2A further includes step 202a. Step 202a may be performed before step 202.

202a: The first communication apparatus sends a trigger instruction to the second communication apparatus.

The trigger instruction is used to trigger the second communication apparatus to enable the sensing function.

Specifically, before sending the sensing signal, the first communication apparatus may trigger, by using the trigger instruction, the second communication apparatus to enable the sensing function, so that the second communication apparatus receives the sensing signal and performs sensing measurement on the sensing signal.

Optionally, the trigger instruction is an RRC instruction or a DCI instruction.

A manner in which the third communication apparatus triggers the second communication apparatus to enable the sensing function is similar to the foregoing step 202a, and details are not described herein again.

In this embodiment, if the first communication apparatus serves as the transmit end and the receive end of the sensing signal, optionally, the embodiment shown in FIG. 2A further includes step 203 and step 204. Step 203 and step 204 may be performed after step 202.

203: The first communication apparatus receives the reflected sensing signal on the first frequency domain resource.

For example, as shown in FIG. 1A, a network device 1 separately sends sensing signals on frequency points whose frequencies are separately $f_0$, $f_2$, $f_4$, and $f_6$. The sensing signals are reflected to the network device 1 through a vehicle (namely, a sensing target) in a surrounding environment. The network device 1 receives, on the frequency points whose frequencies are separately $f_0$, $f_2$, $f_4$, and $f_6$, the sensing signals reflected by the sensing target.

For example, the first communication apparatus is a radar device. The radar device sends a frequency modulated continuous wave signal in a frequency band between a frequency $f_0$ and a frequency $f_6$. The sensing signal is reflected back to the radar device through a sensing target in the surrounding environment. The radar device receives the frequency modulated continuous wave signal in the frequency band between the frequency $f_0$ and a frequency $f_6$.

204: The first communication apparatus performs sensing measurement on the sensing signal, to obtain a sensing result.

In this embodiment, optionally, the sensing result includes a distance between the first communication apparatus and the sensing target, a quantity of motions of the sensing target, a position of the sensing target, and the like.

For example, as shown in FIG. 1A, a network device 1 transmits sensing signals on two subcarriers whose frequency points are separately 3.5 GHz and 3.501 GHz, and initial phases of the sensing signals on the two subcarriers are both 0 at the network device 1. A vehicle is a sensing target. Phase changes caused by the sensing signals on the two subcarriers whose frequency points are separately 3.5 GHz and 3.501 GHz are separately $700\pi$ and $700.2\pi$. In addition, a difference between the phase changes on the two subcarriers is $\Delta\phi_{21}=0.27\pi$. In this case, the network device 1 may determine that $$\tau = \frac{\Delta\phi_{21}}{(2\pi(f_2 - f_1))} = 0.2\pi/(2\pi * 10^6)\text{ns} = 100 \text{ ns},$$

where $f_1$=3.501 GHz, and $f_2$=3.5 GHz. Therefore, a distance between the network device 1 and the vehicle is R1=c$\tau$/2=15 m, where c is the propagation speed of light under the standard atmosphere condition.

A speed at which the vehicle moves relative to the network device 1 may be determined based on a change of the distance r between the network device 1 and the vehicle relative to time. A position of the vehicle may be obtained by jointly performing sensing ranging on the vehicle by a plurality of network devices. For example, each network device in the plurality of network devices can obtain a distance between the network device and the vehicle. In this case, ranging results of four network devices may be combined to obtain coordinates of the vehicle in three-dimensional space, that is, the position of the vehicle.

In this embodiment, if the first communication apparatus serves as the transmit end of the sensing signal, and the second communication apparatus serves as the receive end of the sensing signal, optionally, the embodiment shown in FIG. 2A further includes step 205 to step 207. Step 205 to step 207 may be performed after step 202.

205: The second communication apparatus determines the first frequency domain resource.

In step 205, the second communication apparatus may autonomously determine the first frequency domain resource based on the sensing requirement parameter. Alternatively, the second communication apparatus receives first information from the first communication apparatus, and determines the first frequency domain resource based on the first information. Step 205 is similar to the foregoing step 201. For details, refer to related descriptions of the foregoing step 201. Details are not described herein again.

206: The second communication apparatus receives the sensing signal on the first frequency domain resource.

For example, the first frequency domain resource includes a frequency point 0, a frequency point 2, a frequency point 4, and a frequency point 6. A frequency of the frequency point 0 is $f_0$, a frequency of the frequency point 2 is $f_2$, a frequency of the frequency point 4 is $f_4$, and a frequency of the frequency point 6 is $f_6$. In this case, the second communication apparatus separately receives sensing signals on frequency points whose frequencies are separately $f_0$, $f_2$, $f_4$, and $f_6$.

207: The second communication apparatus performs sensing measurement on the sensing signal, to obtain a sensing result.

For example, as shown in FIG. 1B, a network device 1 transmits signals on three subcarriers whose frequencies are separately 3.5 GHz, 3.501 GHz, and 3.503 GHz, and initial phases of the sensing signals on the three subcarriers are all 0 at the network device 1. A vehicle is a sensing target. A sum of a distance between the network device 1 and the vehicle and a distance between the vehicle and a terminal device 1 is R1+R2. In this case, the sensing signals are propagated to the vehicle through R1 and then propagated to the terminal device through R2.

A subcarrier with a frequency of 3.5 GHz is referred to as a subcarrier 1, and $f_1$=3.5 GHz. A subcarrier with a frequency of 3.501 GHz is referred to as a subcarrier 2, and $f_2$=3.501 GHz. A subcarrier with a frequency of 3.503 GHz is referred to as a subcarrier 3, and $f_3$=3.503 GHz.

Phase changes caused by the sensing signals on the subcarrier 1, the subcarrier 2, and the subcarrier 3 are separately 700.01$\pi$, 700.19$\pi$, and 700.61$\pi$. In addition, a difference between phase changes on the subcarrier 1 and the subcarrier 2 is $\Delta\phi_{21}$=0.18$\pi$. In this case, the network device 1 may determine that $$\tau_1 = \frac{\Delta\phi_{21}}{(2\pi(f_2 - f_1))} = 0.18\pi/(2\pi * 10^6)\text{ns} = 90 \text{ ns}.$$

Therefore, it is obtained through calculation that a distance from the network device 1 to the vehicle and then to the terminal device is R1+R2=c$\tau_1$=27 m.

A difference between phase changes of sensing signals on the subcarrier 2 and the subcarrier 3 is $\Delta\phi_{32}$=0.42$\pi$. In this case, the network device 1 may determine that $$\tau_2 = \frac{\Delta\phi_{32}}{(2\pi(f_3 - f_2))} = 0.42\pi/(2\pi * 10^6)\text{ns} = 105 \text{ ns}.$$

Therefore, it is obtained through calculation that a distance from the network device 1 to the vehicle and then to the terminal device is R1+R2=c$\tau_2$=31.5 m.

A difference between phase changes of sensing signals on the subcarrier 1 and the subcarrier 3 is $\Delta\phi_{31}$=0.6$\pi$. In this case, the network device 1 may determine that $$\tau_3 = \frac{\Delta\phi_{31}}{(2\pi(f_3 - f_1))} = 0.6\pi/(2\pi * 10^6)\text{ns} = 100 \text{ ns}.$$

Therefore, it is obtained through calculation that a distance from the network device 1 to the vehicle and then to the terminal device is R1+R2=c$\tau_3$=30 m. c is the propagation speed of light under the standard atmosphere condition.

It can be learned from the foregoing calculation results that results obtained through calculation based on different subcarriers are different. This is mainly because noise exists in an actual measurement process, resulting in a measurement deviation. Therefore, the network device 1 may average the measurement results of the different subcarriers to obtain a final result, to reduce impact of the measurement noise. In this case, the sum of the distance between the network device 1 and the vehicle and the distance between the vehicle and the terminal device is (27 m+31.5 m+30 m)/3=29.5 m.

It should be noted that the network device 1 or the terminal device may determine the distance from the network device 1 to the vehicle and then to the terminal device with reference to a specific application scenario. For example, in a vehicle positioning scenario with a high safety requirement, the terminal device is a vehicle 2. In this case, the network device 1 or the vehicle 2 may use a distance 27 m from the network device 1 to the vehicle and then to the vehicle 2 as a final measurement result. This can avoid a driving safety problem between the vehicle 1 and the vehicle 2 due to a measurement deviation.

The distance between the network device 1 and the vehicle, the distance between the vehicle and the terminal device, and a position of the vehicle may be obtained through joint ranging by a plurality of network devices and the terminal device. For example, the terminal device may obtain the distance between the terminal device and the vehicle and distances separately between the vehicle and the plurality of network devices. In this case, ranging results of the terminal device for four network devices may be combined to obtain coordinates of the vehicle in three-dimensional space, that is, the position of the vehicle. A speed of the vehicle may be obtained based on a change of the position of the vehicle relative to time.

In this embodiment of this application, the first communication apparatus determines the first frequency domain resource, where the first frequency domain resource is determined from the frequency domain resource pool based on the sensing requirement parameter. Then, the first communication apparatus sends the sensing signal on the first frequency domain resource. It can be learned that, in the technical solutions of this application, the first frequency domain resource is selected from the frequency domain resource pool based on the sensing requirement parameter. The first communication apparatus may send the sensing signal on the first frequency domain resource. In this way, the first communication apparatus may implement sensing of the surrounding environment by sending the sensing signal while performing communication. Further, the first frequency domain resource is determined with reference to the sensing requirement parameter. In this way, a sensing requirement can be met, and sensing performance can be improved.

In this embodiment of this application, the first communication apparatus determines the first frequency domain resource in a plurality of manners. The following shows two possible implementations. Specific descriptions are separately provided with reference to FIG. 2C and FIG. 2D.

The following describes a first implementation with reference to an embodiment shown in FIG. 2C.

With reference to FIG. 2C, step 201 specifically includes step 201*a* and step 201*b*.

Step 201*a*: The first communication apparatus obtains the sensing requirement parameter.

Specifically, the first communication apparatus may obtain the sensing requirement parameter in a plurality of manners. The following shows two possible implementations.

Implementation 1: The first communication apparatus determines the sensing requirement parameter based on a sensing requirement.

In a possible implementation, the sensing requirement includes a requirement for performing sensing ranging by using the sensing signal.

For example, as shown in FIG. 1B, a network device 1 autonomously determines an unambiguous ranging distance, a ranging resolution, and the like based on a sensing requirement.

Implementation 2: The first communication apparatus receives the sensing requirement parameter from the second communication apparatus or the third communication apparatus.

For example, as shown in FIG. 1B, the first communication apparatus is a network device 1, and the second communication apparatus is a terminal device. The terminal device may send a sensing request and a corresponding sensing requirement parameter to the network device 1, so that the terminal device performs sensing on a surrounding environment by using a sensing signal. Correspondingly, the network device 1 receives the sensing request and the sensing requirement parameter from the terminal device. The sensing request is used to request the network device 1 to send the sensing signal.

For example, as shown in FIG. 1F, the first communication apparatus is a network device 1, the second communication apparatus is a network device 2, and the third communication apparatus is a network device 3. The network device 3 may send a sensing requirement parameter to the network device 1, and send a trigger instruction to the network device 2. The trigger instruction is used to trigger the network device 2 to enable a sensing function.

Step 201*b*: The first communication apparatus determines the first frequency domain resource based on the sensing requirement parameter.

Figures 2D, 3:
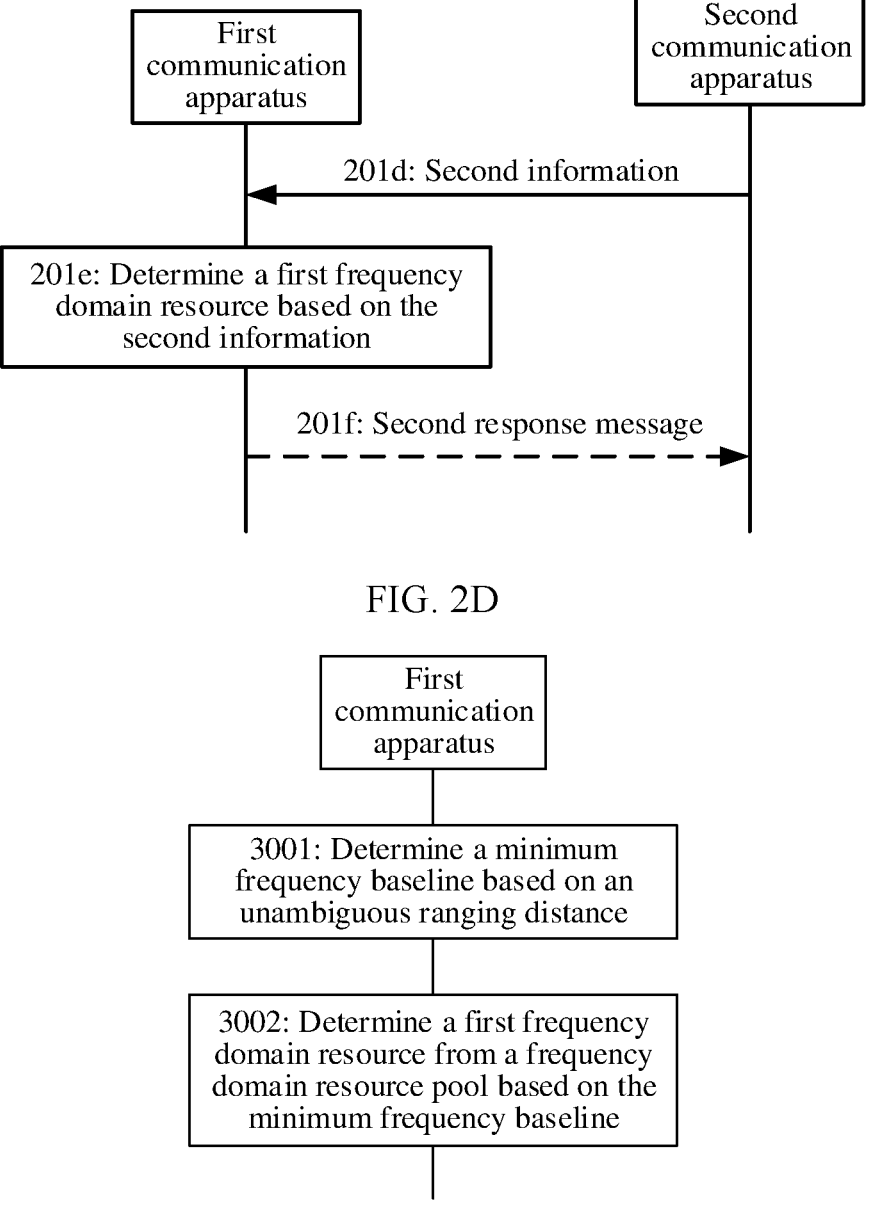
FIG. 2D is another schematic interaction diagram of a communication method according to an embodiment of this application.
FIG. 3 is a schematic flowchart of a communication method according to an embodiment of this application.

For details of step 201*b*, refer to the following detailed descriptions in embodiments shown in FIG. 3 to FIG. 5. Details are not described herein.

Based on the implementations of step 201*a* and step 201*b*, optionally, the embodiment shown in FIG. 2C further includes step 201*c*. Step 201*c* is performed after step 201*b*.

With reference to FIG. 2C, step 201*c* is specifically as follows. The first communication apparatus sends the first information to the second communication apparatus. Correspondingly, the second communication apparatus receives the first information from the first communication apparatus.

The first information indicates a frequency domain position of the first frequency domain resource.

Specifically, the first communication apparatus indicates the frequency domain position of the first frequency domain resource to the second communication apparatus by using the first information.

In this embodiment, there are a plurality of indication manners of the first information. The following shows two possible indication manners.

Indication manner 1: The first information includes the frequency domain position of the first frequency domain resource.

In this indication manner, the first information specifically includes specific position information of the first frequency domain resource. For example, the first frequency domain resource includes a frequency point 1, a frequency point 2, and a frequency point 3. The first information includes frequencies separately corresponding to the frequency point 1, the frequency point 2, and the frequency point 3.

Indication manner 2: The first information includes a sensing quality index (SQI).

The sensing quality index indicates the frequency domain position of the first frequency domain resource.

In this indication manner, a table is preconfigured in the first communication apparatus and the second communication apparatus. The table indicates a mapping relationship between a sensing quality index and a frequency domain resource. In the table, the sensing quality index has a corresponding frequency domain resource.

For example, as shown in Table 1, the following uses a manner in which the first frequency domain resource includes a frequency point combination as an example for description.

TABLE 1

| Sensing quality index | Frequencies separately corresponding to frequency points included in the frequency point combination |
|---|---|
| 0 | $f_0, f_2, f_4, f_6$ |
| 1 | $f_0, f_1, f_3, f_4$ |
| 2 | $f_0, f_2, f_4, f_6, f_{12}$ |
| 3 | $f_0, f_1, f_4$ |
| . . . | . . . |

$f_x$ refers to a frequency of a frequency point x. x is a positive integer belonging to [0, M], and M is a positive integer. A value of M is a total quantity of frequency points included in the frequency domain resource pool.

In this embodiment, optionally, the first information is carried in RRC signaling or DCI signaling.

In this embodiment, optionally, after the second communication apparatus receives the first information from the first communication apparatus, the second communication apparatus feeds back a first response message to the first communication apparatus, to notify the first communication apparatus that the second communication apparatus successfully receives the first information. Optionally, the embodiment shown in FIG. 2C further includes step 201d. For details, refer to FIG. 2C. Step 201d may be performed after step 201c.

Step 201d: The second communication apparatus sends the first response message to the first communication apparatus. Correspondingly, the first communication apparatus receives the first response message from the second communication apparatus.

The first response message is used to notify the first communication apparatus that the second communication apparatus successfully receives the first information.

The following describes a second implementation with reference to FIG. 2D.

FIG. 2D is a schematic diagram of another embodiment of the communication method according to an embodiment of this application. If the first communication apparatus serves as the transmit end of the sensing signal, the second communication apparatus serves as the receive end of the sensing signal. With reference to FIG. 2D, optionally, step 201 specifically includes step 201d and step 201e.

Step 201d: The second communication apparatus sends second information to the first communication apparatus. Correspondingly, the first communication apparatus receives the second information from the second communication apparatus.

The second information indicates a frequency domain position of the first frequency domain resource.

In this implementation, the second communication apparatus determines the first frequency domain resource, and then notifies the first communication apparatus of the frequency domain position of the first frequency domain resource by using the second information. A manner in which the second communication apparatus determines the first frequency domain resource is similar to the process in which the first communication apparatus determines the first frequency domain resource in step 201b. For details, refer to related descriptions of determining the first frequency domain resource by the first communication apparatus in step 201b in FIG. 2C. Details are not described herein again.

An indication manner of the second information is similar to the indication manner of the first information. For details, refer to related descriptions of the indication manner of the first information. Details are not described herein again.

In this embodiment, optionally, the second information is carried in RRC signaling or DCI signaling.

Step 201e: The first communication apparatus determines the first frequency domain resource based on the second information.

Optionally, after the first communication apparatus receives the second information, the embodiment shown in FIG. 2D further includes step 201f. Step 201f is performed after step 201e.

201f: The first communication apparatus sends a second response message to the second communication apparatus. Correspondingly, the second communication apparatus receives the second response message from the first communication apparatus.

The second response message is used to notify the second communication apparatus that the first communication apparatus successfully receives the second information.

In this embodiment of this application, there are a plurality of manners in which the first communication apparatus determines the first frequency domain resource based on the sensing requirement parameter in step 201b. The following shows two possible implementations.

Implementation 1: The first communication apparatus determines the first frequency domain resource based on the sensing requirement parameter and a first mapping relationship.

The first mapping relationship includes a mapping relationship between a sensing requirement parameter and a frequency domain resource.

Optionally, the first mapping relationship may be represented by using a table. For example, Table 2 uses an example in which the first frequency domain resource includes a frequency point combination, and the sensing requirement parameter includes the unambiguous ranging distance and the ranging resolution for description.

TABLE 2

| Unambiguous ranging distance (m) | Ranging resolution (m) | Frequencies separately corresponding to frequency points included in the frequency point combination (Hz) |
|---|---|---|
| 90 | 10 | $\{f(j)|f(j) = 3.5 * 10^9 + j * 15 * 10^3, j = 0, 200, 800, 1400, 1800\}$ |
| 130 | 10 | $\{f(j)|f(j) = 3.5 * 10^9 + j * 15 * 10^3, j = 0, 200, 400, 1200, 2000, 2600\}$ |

TABLE 2-continued

| Unambiguous ranging distance (m) | Ranging resolution (m) | Frequencies separately corresponding to frequency points included in the frequency point combination (Hz) |
|---|---|---|
| 90 | 5 | $\{f(j)|f(j) = 3.5 * 10^9 + j * 15 * 10^3,$ $j = 0, 100, 200, 600, 1000, 1400, 1700, 1800\}$ |
| 130 | 5 | $\{f(j)|f(j) = 3.5 * 10^9 + j * 15 * 10^3,$ $j = 0, 100, 200, 1100, 1500, 1800, 2100, 2300, 2600\}$ |

For example, in the sensing requirement parameter, if the unambiguous ranging distance is 90 and the ranging resolution is 10, the first communication apparatus may determine, based on the foregoing Table 2, that the frequency point combination is $\{f(j)|f(j)=3.5*10^9+j*15*10^3, j=0, 200, 800, 1400, 1800\}$.

It should be noted that when the unambiguous ranging distance and the ranging resolution in the sensing requirement parameter do not match any group of an unambiguous ranging distance and a ranging resolution in Table 2, the first communication apparatus may select, as the first frequency domain resource, a frequency point combination corresponding to a group of an unambiguous ranging distance and a ranging resolution that approximate to the unambiguous ranging distance and the ranging resolution in the sensing requirement parameter.

For example, in the sensing requirement parameter, the unambiguous ranging distance is 89, and the ranging resolution is 11. In this case, the first communication apparatus may select, as the first frequency domain resource, a frequency point combination corresponding to the unambiguous ranging distance 90 and the ranging resolution 10 in Table 2.

It can be learned from Table 2 that, when a same ranging resolution is required, a larger unambiguous ranging distance indicates a larger quantity of frequency points included in the frequency point combination, to meet a requirement of the unambiguous ranging distance.

For example, as shown in Table 2, the unambiguous ranging distance 90 and the ranging resolution 10 correspond to the frequency point combination $\{f(j)|f(j)=3.5*10^9+j*15*10^3, j=0, 200, 800, 1400, 1800\}$. The unambiguous ranging distance 130 and the ranging resolution 10 correspond to the frequency point combination $\{f(j)|f(j)=3.5*10^9+j*15*10^3, j=0, 200, 400, 1200, 2000, 2600\}$. A quantity of frequency points included in the frequency point combination $\{f(j)|f(j)=3.5*10^9+j*15*10^3, j=0, 200, 400, 1200, 2000, 2600\}$ is clearly greater than a quantity of frequency points included in the frequency point combination $\{f(j)|f(j)=3.5*10^9+j*15*10^3, j=0, 200, 800, 1400, 1800\}$.

It can be learned from Table 2 that, in the sensing requirement parameter, when a same unambiguous ranging distance is required, a smaller ranging resolution indicates a larger quantity of frequency points included in the frequency point combination, to meet a requirement of the ranging resolution.

For example, as shown in Table 2, the unambiguous ranging distance 90 and the ranging resolution 10 correspond to the frequency point combination $\{f(j)|f(j)=3.5*10^9+j*15*10^3, j=0, 200, 800, 1400, 1800\}$.

The unambiguous ranging distance 90 and the ranging resolution 5 correspond to the frequency point combination $\{f(j)|f(j)=3.5*10^9+j*15*10^3, j=0, 100, 200, 600, 1000, 1400, 1700, 1800\}$. It can be learned that a quantity of frequency points included in the frequency point combination $\{f(j)|f(j)=3.5*10^9+j*15*10^3, j=0, 100, 200, 600, 1000, 1400, 1700, 1800\}$ is clearly greater than a quantity of frequency points included in the frequency point combination $\{f(j)|f(j)=3.5*10^9+j*15*10^3, j=0, 200, 800, 1400, 1800\}$.

It should be noted that Table 2 may be preconfigured on the first communication apparatus, or may be sent by another communication apparatus to the first communication apparatus. Alternatively, the first communication apparatus determines, in a manner in an implementation 2 based on a plurality of groups of sensing requirement parameters, a frequency point combination corresponding to each group of sensing requirement parameters, and then generates and saves Table 2.

In the implementation 1, the first communication apparatus determines the first frequency domain resource in a table lookup manner. In this way, time consumed by the first communication apparatus to determine the first frequency domain resource is short, and calculation resources can be effectively saved.

Implementation 2: The first communication apparatus determines the first frequency domain resource from the frequency domain resource pool based on content included in the sensing requirement parameter.

1. With reference to FIG. 3, the following describes a method in which the first communication apparatus determines the first frequency domain resource from the frequency domain resource pool based on the sensing requirement parameter when the sensing requirement parameter includes the unambiguous ranging distance. With reference to FIG. 3, step 201*b* specifically includes step 3001 and step 3002.

3001: The first communication apparatus determines the minimum frequency baseline based on the unambiguous ranging distance.

Specifically, the unambiguous ranging distance is $r_{max}$, so that the first communication apparatus may determine that a length of the minimum frequency baseline is $$|b_{min}| = \frac{c}{r_{max}}.$$

The following describes a specific principle of step 3001. It is assumed that the first communication apparatus performs sensing ranging by using two subcarriers. Frequencies of the two subcarriers are separately $f_1$ and $f_2$. The first communication apparatus separately sends sensing signals on the two subcarriers, and the sensing signals are reflected to the second communication apparatus through a target point. The second communication apparatus receives the reflected sensing signals. A delay of the sensing signal passing through an entire path is $\tau$. It is assumed that initial phases of the sensing signals on the two subcarriers are both 0 at the first communication apparatus. In this case, after the delay $\tau$, phase changes on the two subcarriers are separately $2\pi f_1 \tau$ and $2\pi f_2 \tau$.

A difference between the phase changes on the two subcarriers may be represented by $$\Delta\phi_{21} = 2\pi(f_2 - f_1)\tau.$$

The second communication apparatus may measure the phase changes on the two subcarriers, and obtain the difference $\Delta\phi_{21}$ between the phase changes on the two subcarriers. In this case, $\tau = \Delta\phi_{21}/(2\pi(f_2 - f_1))$, and a sum of a distance between the first communication apparatus and the target point and a distance between the target point and the second communication apparatus is $r = c\tau = c^*\Delta\phi_{21}/(2\pi(f_2 - f_1))$. c is the propagation speed of light under the standard atmosphere condition.

It can be learned from the formula $\tau = \Delta\phi_{21}/(2\pi(f_2 - f_1))$ that a smaller frequency baseline indicates a smaller value of $|f_2 - f_1|$. Therefore, with a change of $\tau$, $\Delta\phi_{21} = 2\pi(f_2 - f_1)\tau$ is less likely to exceed $2\pi$ (because if $\Delta\phi_{21}$ exceeds $2\pi$, phase ambiguity occurs, resulting in ranging ambiguity). Therefore, $2\pi(f_2 - f_1)\tau \leq 2\pi$, and it is required that $$\tau \leq \frac{1}{(f_2 - f_1)}.$$

In this case, a smaller value of $|f_2 - f_1|$ indicates a larger value of $\tau$ and a larger unambiguous distance. Therefore, in step 3001, the first communication apparatus may determine the minimum frequency baseline for the frequency point combination with reference to the unambiguous ranging distance.

It should be noted that the initial phases of the sensing signals on the two subcarriers may not be 0 at the first communication apparatus. The foregoing is merely an example, and is not intended to limit the technical solutions of this application.

If $\Delta\phi_{21}$ exceeds $2\pi$, phase ambiguity occurs, resulting in ranging ambiguity. For example, it is assumed that an actual value of $\Delta\phi_{21}$ is $2k\pi + \pi/3$, and an actual value obtained through measurement is $\pi/3$. It is determined based on the actual value obtained through measurement that a delay is $1/(6(f_2 - f_1))$, but an actual delay is $(k + 1/6)/(f_2 - f_1)$. Therefore, a maximum value of the difference $\Delta\phi_{21}$ between the phase changes on the subcarriers is $2\pi$, and a corresponding delay is $\tau_{max} = 1/(f_2 - f_1)$. Correspondingly, $R_{max} = c\tau_{max} = c(f_2 - f_1)$. In this case, $R_{max}$ is referred to as a maximum unambiguous ranging distance. In other words, if a sum of a distance between the first communication apparatus and a sensing target and a distance between the second communication apparatus and the sensing target is less than $R_{max}$, no ranging ambiguity occurs. If the sum of the distance between the first communication apparatus and the sensing target and the distance between the second communication apparatus and the sensing target is greater than or equal to $R_{max}$, ranging ambiguity occurs.

3002: The first communication apparatus determines the first frequency domain resource from the frequency domain resource pool based on the minimum frequency baseline.

An example in which the first frequency domain resource includes a frequency point combination is used herein for description. Specifically, the first communication apparatus selects frequency points from frequency points included in the frequency domain resource pool, to obtain a frequency point combination. The frequency point combination meets the minimum frequency baseline. In other words, if frequency baselines formed by the frequency points included in the frequency point combination include a frequency baseline with a length less than or equal to $|b_{min}|$, it may be considered that the frequency point combination meets the minimum frequency baseline.

In step 3002, optionally, the first communication apparatus may determine the first frequency domain resource in the following manner.

In a possible implementation, the first communication apparatus determines, in the frequency domain resource pool according to an exhaustion method, a plurality of frequency point combinations that meet the minimum frequency baseline. Then, the first communication apparatus selects one frequency point combination from the plurality of frequency point combinations.

In another possible implementation, the first communication apparatus determines, by using a simulated annealing algorithm (or an ant colony algorithm) and frequency points included in the frequency domain resource pool, a frequency point combination that meets the minimum frequency baseline.

For example, the frequency point combination includes a frequency point 0, a frequency point 2, a frequency point 4, and a frequency point 6. In the frequency point combination, frequency points are arranged in ascending order of frequencies. A frequency of the frequency point 0 is $f_0$, a frequency of the frequency point 2 is $f_2$, a frequency of the frequency point 4 is $f_4$, and a frequency of the frequency point 6 is $f_6$. The unambiguous ranging distance is $r_{max}$, so that the length of the minimum frequency baseline is $$|b_{min}| = \frac{1}{r_{max}}.$$

In frequency baselines formed by two different frequency points in the frequency point combination, a length $|f_0 - f_2|$ of a frequency baseline formed by the frequency point 0 and the frequency point 2 is the smallest. If $|f_0 - f_2|$ is less than or equal to $|b_{min}|$, it may be understood that the frequency point combination meets the minimum frequency baseline.

It should be noted that the second communication apparatus may also determine the first frequency domain resource according to the embodiment shown in FIG. 3.

2. With reference to FIG. 4, the following describes a method in which the first communication apparatus determines the first frequency domain resource from the frequency domain resource pool based on the sensing requirement parameter when the sensing requirement parameter includes the ranging resolution. With reference to FIG. 4, step 201b specifically includes step 4001 and step 4002.

4001: The first communication apparatus determines the maximum frequency baseline based on the ranging resolution.

Specifically, the ranging resolution is $\Delta r$, so that the first communication apparatus may determine that a length of the maximum frequency baseline is $$|b_{max}| = \frac{c}{\Delta r}.$$

The following describes a specific principle of step 4001. It is assumed that the first communication apparatus performs sensing ranging by using two subcarriers. Frequencies of the two subcarriers are separately $f_1$ and $f_2$. The first communication apparatus separately sends sensing signals on the two subcarriers, and the sensing signals are reflected to the second communication apparatus through a target point. The second communication apparatus receives the reflected sensing signals. A delay of the sensing signal passing through an entire path is $\tau$. It is assumed that initial phases of the sensing signals on the two subcarriers are both 0 at the first communication apparatus. In this case, after the delay $\tau$, phase changes on the two subcarriers are separately $2\pi f_1\tau$ and $2\pi f_2\tau$.

A difference between the phase changes on the two subcarriers may be represented by $$\Delta\phi_{21}=2\pi(f_2-f_1)\tau.$$

The second communication apparatus may measure the phase changes on the two subcarriers, and obtain the difference $\Delta\phi_{21}$ between the phase changes on the two subcarriers. In this case, $\tau=\Delta\phi_{21}/(2\pi(f_2-f_1))$, and a sum of a distance between the first communication apparatus and the target point and a distance between the target point and the second communication apparatus is $r=c\tau=c*\Delta\phi_{21}/(2\pi(f_2-f_1))$. c is the propagation speed of light under the standard atmosphere condition.

It can be learned from the formula $\tau=\Delta\phi_{21}/(2\pi(f_2-f_1))$ that a larger frequency baseline indicates a larger value of $|f_2-f_1|$. For the same delay $\tau$, a larger difference between the phase changes, namely, a larger change of $\Delta\phi_{21}=2\pi(f_2-f_1)\tau$, indicates a larger frequency baseline and higher sensitivity to a change of the delay $\tau$. This is easier to distinguish between different delays. Therefore, in step 4001, the first communication apparatus may determine the maximum frequency baseline for the frequency point combination with reference to the ranging resolution.

It should be noted that the initial phases of the sensing signals on the two subcarriers may not be 0 at the first communication apparatus. The foregoing is merely an example, and is not intended to limit the technical solutions of this application.

4002: The first communication apparatus determines the first frequency domain resource from the frequency domain resource pool based on the maximum frequency baseline.

An example in which the first frequency domain resource includes a frequency point combination is used herein for description. Specifically, the first communication apparatus selects frequency points from frequency points included in the frequency domain resource pool, to obtain a frequency point combination. The frequency point combination meets the maximum frequency baseline. In other words, if frequency baselines formed by the frequency points included in the frequency point combination include a frequency baseline with a length greater than or equal to $|b_{max}|$, it may be considered that the frequency point combination meets the maximum frequency baseline.

A specific determining manner in step 4002 is similar to the determining manner in step 3002 in the embodiment shown in FIG. 3. For details, refer to related descriptions of step 3002 in the embodiment shown in FIG. 3. Details are not described herein again.

For example, the frequency point combination includes a frequency point 0, a frequency point 2, a frequency point 4, and a frequency point 6. In the frequency point combination, frequency points are arranged in ascending order of frequencies. A frequency of the frequency point 0 is $f_0$, a frequency of the frequency point 2 is $f_2$, a frequency of the frequency point 4 is $f_4$, and a frequency of the frequency point 6 is $f_6$. The ranging resolution is $\Delta r$, so that the length of the maximum frequency baseline is $$|b_{max}| = \frac{c}{\Delta r}.$$

In frequency baselines formed by two different frequency points in the frequency point combination, a length of a frequency baseline formed by the frequency point 0 and the frequency point 6 is $|f_0-f_6|$, where $|f_0-f_6|$ is greater than or equal to $|b_{max}|$. In this case, it may be understood that the frequency point combination meets the maximum frequency baseline.

It should be noted that the second communication apparatus may also determine the first frequency domain resource according to the embodiment shown in FIG. 4.

3. With reference to FIG. 5, the following describes a method in which the first communication apparatus determines the first frequency domain resource from the frequency domain resource pool based on the sensing requirement parameter when the sensing requirement parameter includes the unambiguous ranging distance and the ranging resolution. With reference to FIG. 5, step 201b specifically includes step 5001 to step 5003.

5001: The first communication apparatus determines the minimum frequency baseline based on the unambiguous ranging distance.

5002: The first communication apparatus determines the maximum frequency baseline based on the ranging resolution.

Step 5001 is similar to step 3001 in the embodiment shown in FIG. 3. For details, refer to related descriptions of step 5001. Details are not described herein again. Step 5002 is similar to step 4001 in the embodiment shown in FIG. 4. For details, refer to related descriptions of step 4001. Details are not described herein again.

There is no fixed execution sequence between step 5001 and step 5002. Step 5001 may be first performed, and then step 5002 is performed. Alternatively, step 5002 is first performed, and then step 5001 is performed. Alternatively, step 5001 and step 5002 are simultaneously performed based on a situation. This is not specifically limited in this application.

5003: The first communication apparatus determines the first frequency domain resource from the frequency domain resource pool based on the minimum frequency baseline and the maximum frequency baseline.

An example in which the first frequency domain resource includes a frequency point combination is used herein for description. Specifically, the first communication apparatus selects frequency points from frequency points included in the frequency domain resource pool, to obtain a frequency point combination. The frequency point combination meets the minimum frequency baseline and the maximum frequency baseline. For related descriptions of a case in which the frequency point combination meets the minimum frequency baseline and the maximum frequency baseline, refer to related descriptions in the embodiments shown in FIG. 3 and FIG. 4. Details are not described herein again.

Optionally, the frequency point combination includes a subcarrier combination. The subcarrier combination is a subcarrier combination with a smallest quantity of subcarriers in a subcarrier combination that meets a length of the maximum baseline, a length of the minimum baseline, and the first condition.

Specifically, the first communication apparatus searches for a subcarrier combination in real time by using the length of the maximum frequency baseline, the length of the minimum frequency baseline, and the first condition as constraint conditions and by using the smallest quantity of subcarriers as an optimization target, to determine the subcarrier combination. There are a plurality of search algorithms for the subcarrier combination, for example, an exhaustion method, a simulated annealing algorithm, and an ant colony algorithm.

It should be noted that the second communication apparatus may also determine the first frequency domain resource according to the embodiment shown in FIG. 5.

The following describes a case of frequency baseline redundancy in this embodiment of this application.

Figure 6A:
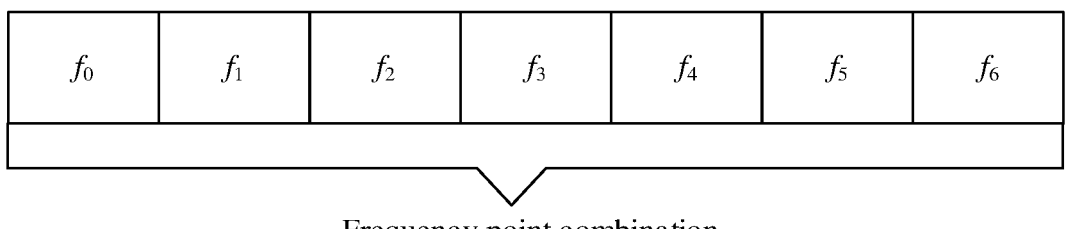
FIG. 6A is a schematic diagram of a frequency point combination according to an embodiment of this application.

For example, as shown in FIG. 6A, frequencies of subcarriers included in a subcarrier combination are separately $f_0$, $f_1$, $f_2$, $f_3$, $f_4$, $f_5$, and $f_6$. The subcarriers included in the subcarrier combination are sorted in ascending order of the frequencies. A frequency spacing between adjacent subcarriers is the same, in other words, the subcarriers included in the subcarrier combination are evenly distributed in frequency domain. A frequency baseline $b_{21} = f_2 - f_1$ may be formed by $f_1$ and $f_2$, and a frequency baseline $b_{32} = f_3 - f_2$ may be formed by $f_2$ and $f_3$. Because the subcarriers are evenly distributed, $f_2 - f_1 = f_3 - f_2$, in other words, the frequency baseline $b_{21}$ and the frequency baseline $b_{32}$ are a same frequency baseline. In this case, frequency baseline redundancy exists.

Physically, a same result is obtained by performing phase difference measurement by using subcarriers whose frequencies are separately $f_1$ and $f_2$ and by performing phase difference measurement by using subcarriers whose frequencies are separately $f_2$ and $f_3$. For the case of the frequency baseline redundancy, phase differences between a plurality of subcarriers cannot be used to obtain more information about the surrounding environment. Therefore, a larger frequency baseline redundancy amount indicates a waste of more subcarrier resources.

In this embodiment of this application, there are a plurality of subcarrier combinations that meet the minimum frequency baseline, the maximum frequency baseline, and the first condition. Subcarriers included in the subcarrier combination may be evenly distributed or non-evenly distributed in frequency domain.

Figure 6B:
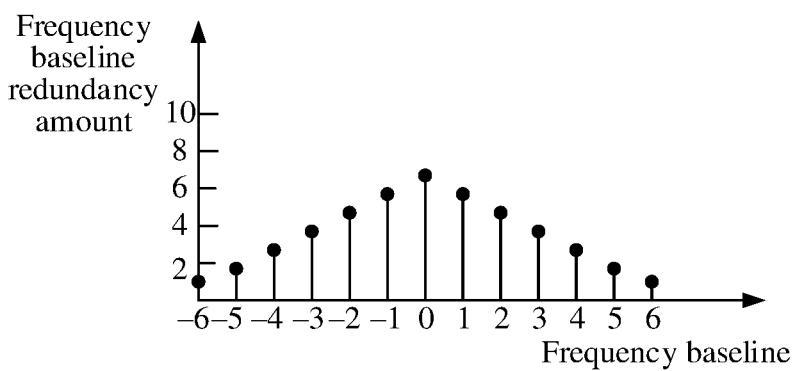
FIG. 6B is a schematic diagram of frequency baselines formed by frequency points included in a frequency point combination and frequency baseline redundancy amounts according to an embodiment of this application.

The following describes, with reference to FIG. 6A and FIG. 6B, a case in which the subcarriers included in the subcarrier combination are evenly distributed.

For example, as shown in FIG. 6A, frequencies of subcarriers included in a subcarrier combination are separately $f_0$, $f_1$, $f_2$, $f_3$, $f_4$, $f_5$, and $f_6$. The subcarriers included in the subcarrier combination are sorted in ascending order of the frequencies. A frequency spacing between adjacent subcarriers is the same, in other words, the subcarriers included in the subcarrier combination are evenly distributed in frequency domain.

For example, $f_0$, $f_1$, $f_2$, $f_3$, $f_4$, $f_5$, and $f_6$ are separately 0, 1, 2, 3, 4, 5, and 6. The first communication apparatus performs sensing ranging by using the subcarriers included in the subcarrier combination. In frequency baselines formed by the subcarriers included in the subcarrier combination, a length $|b_{min}|$ of a smallest frequency baseline is 1, and a length $|b_{max}|$ of a largest frequency baseline is 6. FIG. 6B shows a coverage situation of the frequency baselines formed by the subcarrier combination and a redundancy situation of the frequency baselines. It can be learned from FIG. 6B that a frequency baseline with a length of $k|b_{min}|$ may be formed by the subcarrier combination, where k belongs to [−6, −5, −4, −3, −2, −1, 0, 1, 2, 3, 4, 5, 6]. Therefore, frequency baseline coverage is complete. However, heavy redundancy exists for some frequency baselines.

For example, a redundancy amount of the frequency baseline 1 is 6, in other words, there are six same frequency baselines.

It should be noted that the frequency baseline 0 shown in FIG. 6B is merely a frequency baseline formed by the frequency points included in the frequency point combination. However, during actual application, the first communication apparatus sends a sensing signal once on each subcarrier in the subcarrier combination.

A receive end of the sensing signal obtains same information from redundant frequency baselines. As a result, subcarrier resources are wasted, and more information cannot be obtained. However, measurement noise of the redundant baselines is independent of each other, and redundancy averaging may be performed on the redundant baselines to improve a measurement signal-to-noise ratio. Therefore, during actual application, the first communication apparatus and/or the second communication apparatus may select a corresponding subcarrier combination based on a signal-to-noise ratio requirement in a sensing measurement process. When the signal-to-noise ratio requirement is high, there may be a large quantity of redundant baselines in frequency baselines formed by the subcarrier combination selected by the first communication apparatus and/or the second communication apparatus, so that a measurement signal-to-noise ratio is improved. When the signal-to-noise ratio requirement is low, there may be a small quantity of redundant baselines in frequency baselines formed by the subcarrier combination selected by the first communication apparatus and/or the second communication apparatus, so that a waste of resources is reduced.

Figure 7A:
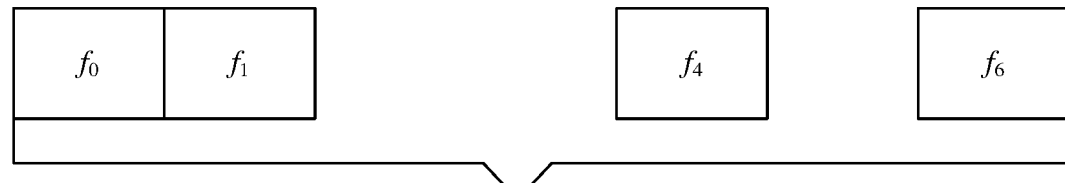
FIG. 7A is another schematic diagram of a frequency point combination according to an embodiment of this application.
Figure 7B:
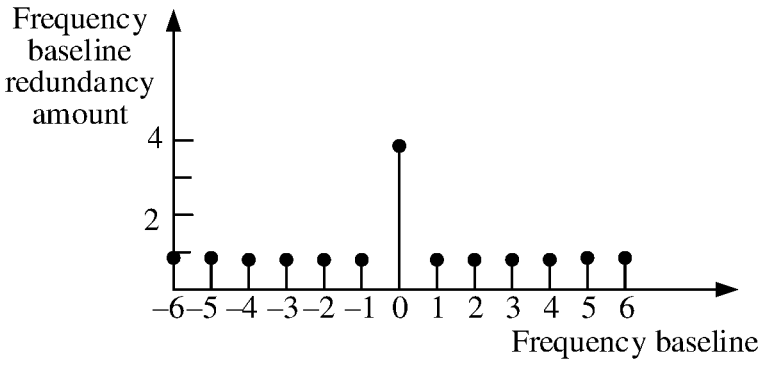
FIG. 7B is another schematic diagram of frequency baselines formed by frequency points included in a frequency point combination and frequency baseline redundancy amounts according to an embodiment of this application.

The following describes, with reference to FIG. 7A and FIG. 7B, a case in which the subcarriers included in the subcarrier combination are non-evenly distributed. For example, as shown in FIG. 7A, frequencies of subcarriers included in a subcarrier combination are separately $f_0$, $f_1$, $f_4$, and $f_6$. The subcarriers included in the subcarrier combination are sorted in ascending order of the frequencies. The subcarriers included in the subcarrier combination are non-evenly distributed in frequency domain.

For example, $f_0$, $f_1$, $f_4$, and $f_6$ are separately 0, 1, 4, and 6. The first communication apparatus performs sensing ranging by using the subcarriers included in the subcarrier combination. In frequency baselines formed by the subcarriers included in the subcarrier combination, a length $|b_{min}|$ of a smallest frequency baseline is 1, and a length $|b_{max}|$ of a largest frequency baseline is 6. FIG. 7B shows a coverage situation of the frequency baselines that may be determined based on the subcarrier combination and a redundancy situation of the frequency baselines. It can be learned from FIG. 7B that a frequency baseline with a length of $k|b_{min}|$ may be formed by the subcarrier combination, where k belongs to [−6, −5, −4, −3, −2, −1, 0, 1, 2, 3, 4, 5, 6]. Therefore, frequency baseline coverage is complete.

It can be learned from FIG. 7B that redundancy exists only on the frequency baseline 0, and no redundancy exists on other frequency baselines. Therefore, it can be learned that the non-evenly distributed subcarrier combination can also obtain complete frequency baseline coverage, and a quantity of redundant frequency baselines is reduced. Therefore, the solution of the non-evenly distributed subcarrier combination can effectively reduce the quantity of redundant frequency baselines, and therefore reduce a quantity of subcarriers and reduce overheads of subcarrier resources used for sensing.

It should be noted that the frequency baseline 0 shown in FIG. 7B is merely a frequency baseline formed by the frequency points included in the frequency point combination. However, during actual application, the first communication apparatus sends a sensing signal once on each subcarrier in the subcarrier combination.

Therefore, in the embodiments shown in FIG. 3, FIG. 4, and FIG. 5, the first communication apparatus may select the non-evenly distributed subcarrier combination as the first frequency domain resource, to reduce a waste of sub carrier resources.

In step 201 in the embodiment shown in FIG. 2A, the first frequency domain resource includes a frequency point combination. The frequency point combination includes a subcarrier combination. The subcarrier combination is a subcarrier combination with a smallest quantity of subcarriers in a subcarrier combination that meets the minimum frequency baseline, the maximum frequency baseline, and the first condition. In this case, it can be learned from related descriptions in FIG. 7A and FIG. 7B that the subcarrier combination is a non-evenly distributed subcarrier combination. In this way, the subcarrier combination is a subcarrier combination that meets the minimum frequency baseline, the maximum frequency baseline, and the first condition, and includes the smallest quantity of subcarriers.

Figure 8:
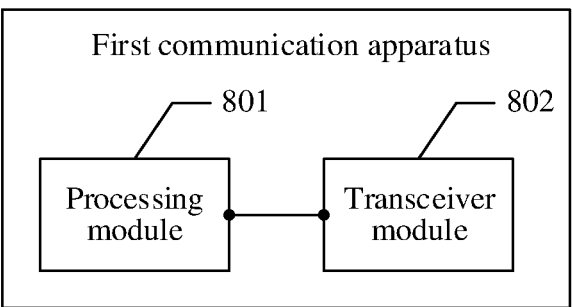
FIG. 8 is a schematic diagram of a structure of a first communication apparatus according to an embodiment of this application.

The following describes a first communication apparatus according to an embodiment of this application. FIG. 8 is a schematic diagram of a structure of the first communication apparatus according to this embodiment of this application. The first communication apparatus may be configured to perform steps performed by the first communication apparatus in the embodiments shown in FIG. 2A, FIG. 2C, FIG. 2D, FIG. 3, FIG. 4, and FIG. 5. For details, refer to related descriptions in the foregoing method embodiments.

The first communication apparatus includes a processing module 801 and a transceiver module 802.

The processing module 801 is configured to determine a first frequency domain resource, where the first frequency domain resource is determined from a frequency domain resource pool based on a sensing requirement parameter.

The transceiver module 802 is configured to send a sensing signal on the first frequency domain resource.

In a possible implementation, the sensing requirement parameter includes at least one of the following: an unambiguous ranging distance or a ranging resolution.

In another possible implementation, the transceiver module 802 is further configured to:

obtain the sensing requirement parameter.

The processing module 801 is specifically configured to:

determine the first frequency domain resource from the frequency domain resource pool based on the sensing requirement parameter.

In another possible implementation, the sensing requirement parameter includes the unambiguous ranging distance, the first frequency domain resource meets a minimum frequency baseline, and the minimum frequency baseline is determined based on the unambiguous ranging distance.

Alternatively, the sensing requirement parameter includes the ranging resolution, the first frequency domain resource meets a maximum frequency baseline, and the maximum frequency baseline is determined based on the ranging resolution.

Alternatively, the sensing requirement parameter includes the unambiguous ranging distance and the ranging resolution, and the first frequency domain resource meets a minimum frequency baseline and a maximum frequency baseline.

In another possible implementation, the first frequency domain resource includes a frequency point combination, and the frequency point combination is a frequency point combination that meets a first condition. The first condition includes: Frequency baselines formed by frequency points included in the frequency point combination include a frequency baseline of a first length. The first length is k*length of the minimum frequency baseline, k is a positive integer belonging to [1, K], K is a ratio of a length of the maximum frequency baseline to the length of the minimum frequency baseline, and K is greater than or equal to 1.

In another possible implementation, the frequency point combination includes a subcarrier combination, and the subcarrier combination is a subcarrier combination with a smallest quantity of subcarriers in a subcarrier combination that meets the minimum frequency baseline, the maximum frequency baseline, and the first condition.

In another possible implementation, the transceiver module 802 is further configured to:

send first information to a second communication apparatus, where the first information indicates a frequency domain position of the first frequency domain resource.

In another possible implementation, the first information includes the frequency domain position of the first frequency domain resource. Alternatively, the first information includes a sensing quality index, and the sensing quality index indicates the frequency domain position of the first frequency domain resource.

In another possible implementation, the first information is carried in RRC signaling or DCI signaling.

In another possible implementation, the transceiver module 802 is further configured to:

send trigger signaling to the second communication apparatus, where the trigger signaling is used to trigger the second communication apparatus to enable a sensing function.

In another possible implementation, a type of the trigger signaling includes RRC signaling or DCI signaling.

In another possible implementation, the transceiver module 802 is specifically configured to:

receive the sensing requirement parameter from a third communication apparatus.

In another possible implementation, the frequency domain resource pool includes a frequency domain resource used to transmit a channel state information reference signal between the first communication apparatus and the second communication apparatus.

Alternatively, the frequency domain resource pool includes a frequency domain resource used to transmit communication data between the first communication apparatus and the second communication apparatus.

In this embodiment of this application, the processing module 801 is configured to determine the first frequency domain resource, where the first frequency domain resource is determined from the frequency domain resource pool based on the sensing requirement parameter. The transceiver module 802 is configured to send the sensing signal on the first frequency domain resource. It can be learned that the first frequency domain resource is selected from the frequency domain resource pool based on the sensing requirement parameter. The transceiver module 802 may send the sensing signal on the first frequency domain resource. In this way, the first communication apparatus may implement sensing of a surrounding environment by sending the sensing signal while performing communication. Further, the first frequency domain resource is determined with reference to the sensing requirement parameter. In this way, a sensing requirement can be met, and sensing performance can be improved.

Figure 9:
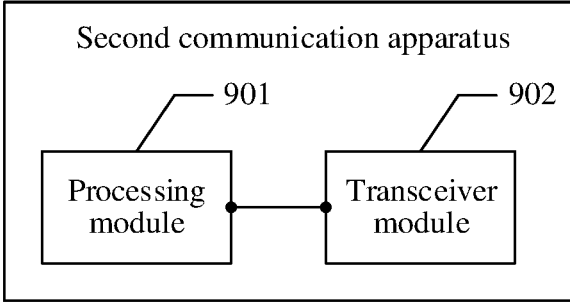
FIG. 9 is a schematic diagram of a structure of a second communication apparatus according to an embodiment of this application.

The following describes a second communication apparatus according to an embodiment of this application. FIG. 9 is a schematic diagram of a structure of the second communication apparatus according to this embodiment of this application. The second communication apparatus may be configured to perform steps performed by the second communication apparatus in the embodiments shown in FIG. 2A, FIG. 2C, and FIG. 2D. For details, refer to related descriptions in the foregoing method embodiments.

The second communication apparatus includes a processing module 901 and a transceiver module 902.

The processing module 901 is configured to determine a first frequency domain resource, where the first frequency domain resource is determined from a frequency domain resource pool based on a sensing requirement parameter.

The transceiver module 902 is configured to receive a sensing signal from a first communication apparatus on the first frequency domain resource.

The processing module 901 is further configured to perform sensing measurement on the sensing signal, to obtain a sensing result.

In a possible implementation, the sensing requirement parameter includes at least one of the following: an unambiguous ranging distance or a ranging resolution.

In another possible implementation, the transceiver module 902 is further configured to:

receive first information from the first communication apparatus, where the first information indicates a frequency domain position of the first frequency domain resource.

In another possible implementation, the first information includes the frequency domain position of the first frequency domain resource. Alternatively, the first information includes a sensing quality index, and the sensing quality index indicates the frequency domain position of the first frequency domain resource.

In another possible implementation, the first information is carried in RRC signaling or DCI signaling.

In another possible implementation, the transceiver module 902 is further configured to:

obtain the sensing requirement parameter.

The processing module 901 is specifically configured to:

determine the first frequency domain resource from the frequency domain resource pool based on the sensing requirement parameter.

In another possible implementation, the sensing requirement parameter includes the unambiguous ranging distance, the first frequency domain resource meets a minimum frequency baseline, and the minimum frequency baseline is determined based on the unambiguous ranging distance.

Alternatively, the sensing requirement parameter includes the ranging resolution, the first frequency domain resource meets a maximum frequency baseline, and the maximum frequency baseline is determined based on the ranging resolution.

Alternatively, the sensing requirement parameter includes the unambiguous ranging distance and the ranging resolution, and the first frequency domain resource meets a minimum frequency baseline and a maximum frequency baseline.

In another possible implementation, the transceiver module 902 is further configured to:

receive trigger signaling from the first communication apparatus, where the trigger signaling is used to trigger the second communication apparatus to enable a sensing function.

In another possible implementation, a type of the trigger signaling includes RRC signaling or DCI signaling.

In another possible implementation, the frequency domain resource pool includes a frequency domain resource used to transmit a channel state information reference signal between the first communication apparatus and the second communication apparatus.

Alternatively, the frequency domain resource pool includes a frequency domain resource used to transmit communication data between the first communication apparatus and the second communication apparatus.

In this embodiment of this application, the processing module 901 is configured to determine the first frequency domain resource, where the first frequency domain resource is determined from the frequency domain resource pool based on the sensing requirement parameter. The transceiver module 902 is configured to receive the sensing signal from the first communication apparatus on the first frequency domain resource. The processing module 901 is further configured to perform sensing measurement on the sensing signal, to obtain the sensing result. It can be learned that the first frequency domain resource is selected from the frequency domain resource pool based on the sensing requirement parameter. The transceiver module 902 receives the sensing signal from the first communication apparatus on the first frequency domain resource. In this way, the second communication apparatus may implement sensing of a surrounding environment by receiving the sensing signal from the first communication apparatus while performing communication. Further, the first frequency domain resource is determined with reference to the sensing requirement parameter. In this way, a sensing requirement can be met, and sensing performance can be improved.

Figure 10:
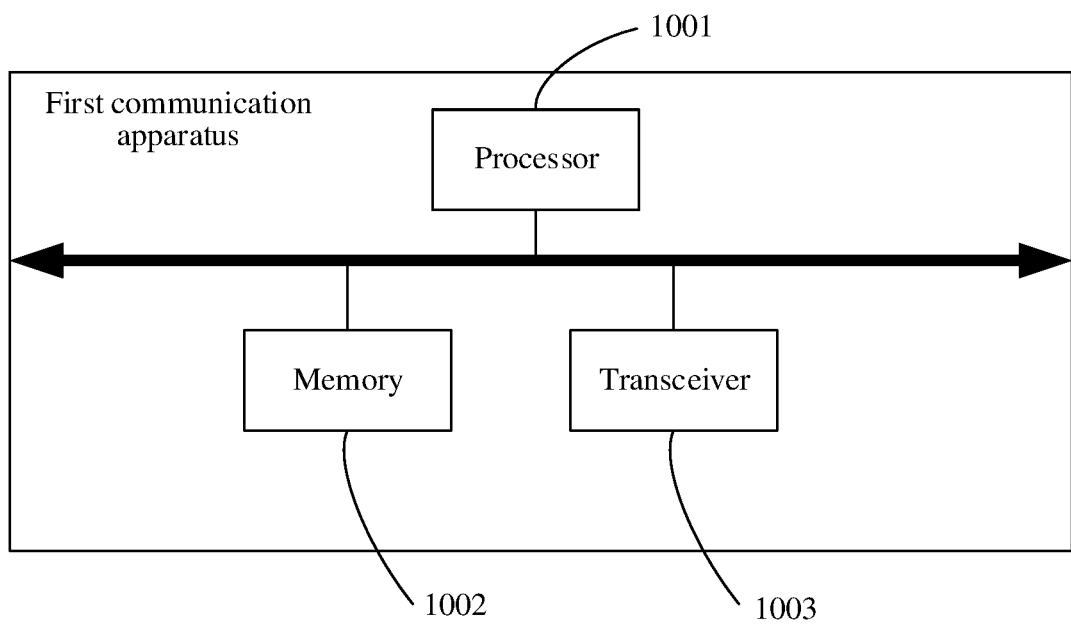
FIG. 10 is another schematic diagram of a structure of a first communication apparatus according to an embodiment of this application.

This application further provides a first communication apparatus. FIG. 10 is another schematic diagram of a structure of the first communication apparatus according to an embodiment of this application. The first communication apparatus may be configured to perform steps performed by the first communication apparatus in the embodiments shown in FIG. 2A, FIG. 2C, FIG. 2D, FIG. 3, FIG. 4, and FIG. 5. For details, refer to related descriptions in the foregoing method embodiments.

The first communication apparatus includes: a processor 1001 and a transceiver 1003. Optionally, the communication apparatus further includes a memory 1002.

In a possible implementation, the processor 1001, the memory 1002, and the transceiver 1003 are connected through a bus, and the memory stores computer instructions.

The processor 1001 in this embodiment may perform actions performed by the processing module 801 shown in FIG. 8. Details of a specific implementation of the processor 1001 are not described. The transceiver 1003 in this embodiment may perform actions performed by the transceiver module 802 in the foregoing embodiment. Details of a specific implementation of the transceiver 1003 are not described.

In the first communication apparatus shown in FIG. 10, the processor 1001 and the memory 1002 may be integrated or separately deployed. This is not specifically limited in this application.

It should be noted that the memory 1002 shown in FIG. 10 may alternatively be deployed outside the first communication apparatus shown in FIG. 10.

Figure 11:
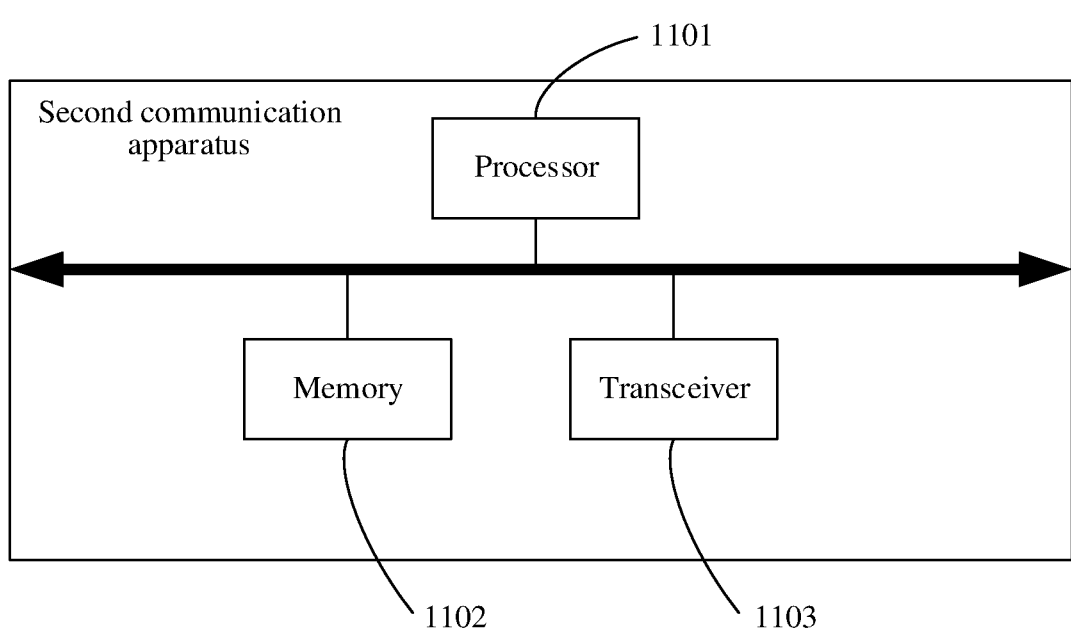
FIG. 11 is another schematic diagram of a structure of a second communication apparatus according to an embodiment of this application.

This application further provides a second communication apparatus. FIG. 11 is another schematic diagram of a structure of the second communication apparatus according to an embodiment of this application. The second communication apparatus may be configured to perform steps performed by the second communication apparatus in the embodiments shown in FIG. 2A, FIG. 2C, and FIG. 2D. For details, refer to related descriptions in the foregoing method embodiments.

The second communication apparatus includes: a processor 1101 and a transceiver 1103. Optionally, the communication apparatus further includes a memory 1102.

In a possible implementation, the processor 1101, the memory 1102, and the transceiver 1103 are connected through a bus, and the memory stores computer instructions.

The processor 1101 in this embodiment may perform actions performed by the processing module 901 shown in FIG. 9. Details of a specific implementation of the processor 1101 are not described. The transceiver 1103 in this embodiment may perform actions performed by the transceiver module 902 in the foregoing embodiment. Details of a specific implementation of the transceiver 1103 are not described.

In the second communication apparatus shown in FIG. 11, the processor 1101 and the memory 1102 may be integrated or separately deployed. This is not specifically limited in this application.

It should be noted that the memory 1102 shown in FIG. 11 may alternatively be deployed outside the second communication apparatus shown in FIG. 11.

Figure 12:
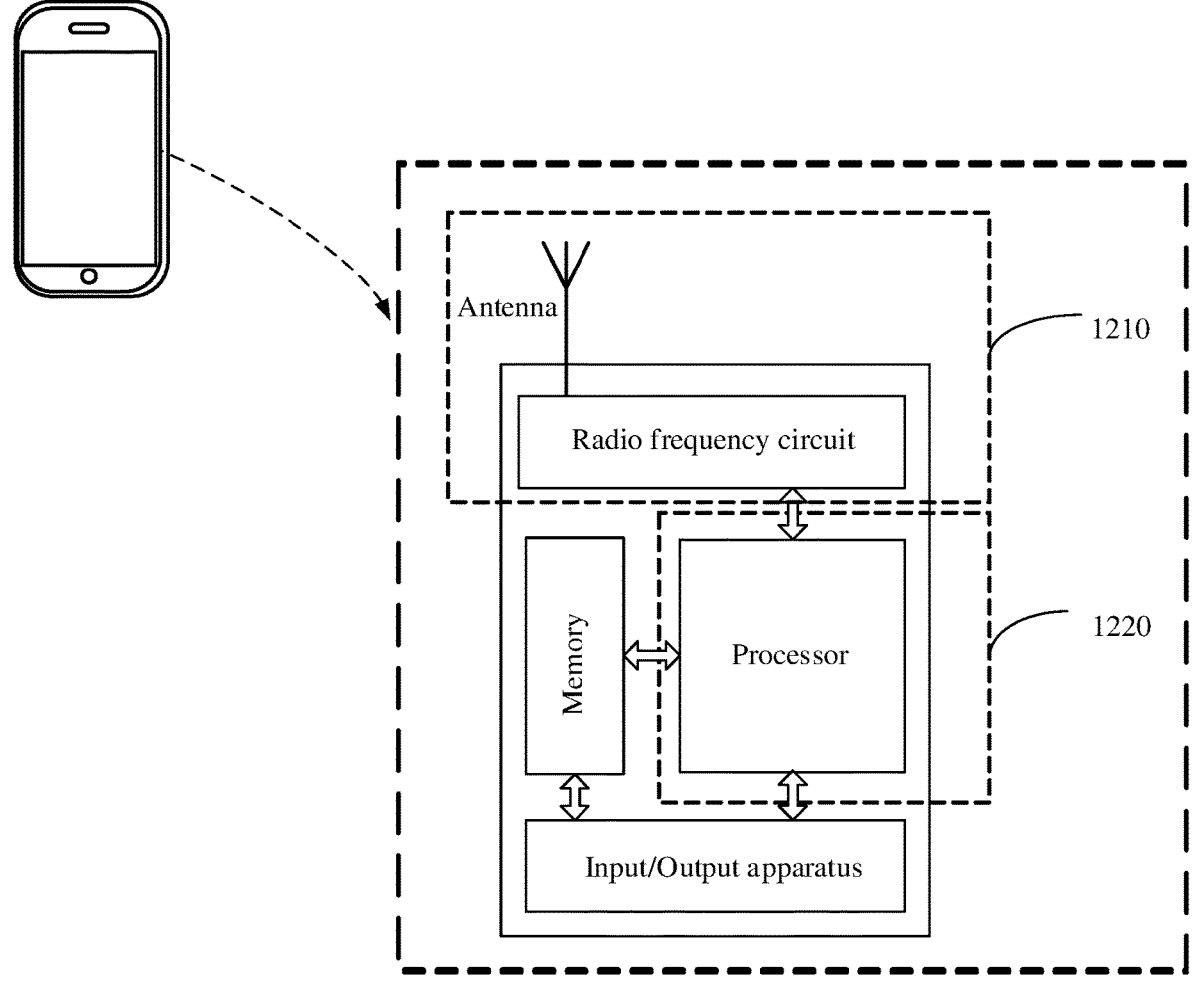
FIG. 12 is a schematic diagram of a structure of a terminal device according to an embodiment of this application.

The following shows, with reference to FIG. 12, a schematic diagram of a possible structure of a terminal device that the first communication apparatus or the second communication apparatus is.

FIG. 12 is a simplified schematic diagram of the structure of the terminal device. For ease of understanding and illustration, in FIG. 12, that the terminal device is a mobile phone is used as an example. As shown in FIG. 12, the terminal device includes a processor, a memory, a radio frequency circuit, an antenna, and an optional input/output apparatus. The processor is mainly configured to: process a communication protocol and communication data, control the terminal device, execute a software program, process data of the software program, and so on. The memory is mainly configured to store the software program and data. The radio frequency circuit is mainly configured to perform conversion between a baseband signal and a radio frequency signal and process the radio frequency signal. The antenna is mainly configured to receive and send radio frequency signals in a form of an electromagnetic wave. The input/output apparatus, for example, a touchscreen, a display, or a keyboard, is mainly configured to receive data input by a user and output data to the user. It should be noted that some types of terminal devices may not have an input/output apparatus.

When data needs to be sent, the processor performs baseband processing on the to-be-sent data, and outputs a baseband signal to the radio frequency circuit. The radio frequency circuit performs radio frequency processing on the baseband signal, and then sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like.

The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 12, the terminal device includes the transceiver unit 1210 and the processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. That is, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

In a possible implementation, the transceiver unit 1210 is configured to perform sending and receiving operations of the first communication apparatus in the foregoing method embodiments, and the processing unit 1220 is configured to perform an operation other than the sending and receiving operations of the first communication apparatus in the foregoing method embodiments.

For example, the processing unit 1220 is configured to perform step 201 and step 204 in FIG. 2A. The transceiver unit 1210 is configured to perform step 202, step 203, step 206, and step 202a in FIG. 2A.

In another possible implementation, the transceiver unit 1210 is configured to perform sending and receiving operations of the second communication apparatus in the foregoing method embodiments, and the processing unit 1220 is configured to perform an operation other than the sending and receiving operations of the second communication apparatus in the foregoing method embodiments.

For example, the processing unit 1220 is configured to perform step 205 and step 207 in FIG. 2A. The transceiver unit 1210 is configured to perform step 202, step 203, step 206, and step 202a in FIG. 2A.

When the terminal device is a chip, the chip includes a transceiver unit and a processing unit. The transceiver unit may be an input/output circuit or a communication interface. The processing unit is a processor, a microprocessor, an integrated circuit, or a logic circuit integrated on the chip.

Figure 13:
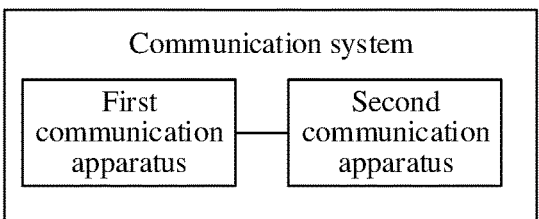
FIG. 13 is a schematic diagram of a communication system according to an embodiment of this application.

With reference to FIG. 13, an embodiment of this application further provides a communication system. The communication system includes the first communication apparatus shown in FIG. 8 and the second communication apparatus shown in FIG. 9. The first communication apparatus shown in FIG. 8 is configured to perform all or some of the steps performed by the first communication apparatus in the embodiments shown in FIG. 2A, FIG. 2C, FIG. 2D, FIG. 3, FIG. 4, and FIG. 5. The second communication apparatus shown in FIG. 9 is configured to perform all or some of the steps performed by the second communication apparatus in the embodiments shown in FIG. 2A, FIG. 2C, and FIG. 2D.

An embodiment of this application further provides a computer program product including computer instructions. When the computer program product runs on a computer, the communication methods in the embodiments shown in FIG. 2A, FIG. 2C, FIG. 2D, FIG. 3, FIG. 4, and FIG. 5 are performed.

An embodiment of this application further provides a computer-readable storage medium, including computer instructions. When the computer instructions are run on a computer, the communication methods in the embodiments shown in FIG. 2A, FIG. 2C, FIG. 2D, FIG. 3, FIG. 4, and FIG. 5 are performed.

An embodiment of this application further provides a chip apparatus, including a processor. The processor is configured to connect to a memory and invoke a program stored in the memory, so that the processor performs the communication methods in the embodiments shown in FIG. 2A, FIG. 2C, FIG. 2D, FIG. 3, FIG. 4, and FIG. 5.

The processor mentioned above may be a general-purpose central processing unit, a microprocessor, an application-specific integrated circuit (ASIC), or one or more integrated circuits for controlling program execution of the communication methods in the embodiments shown in FIG. 2A, FIG. 2C, FIG. 2D, FIG. 3, FIG. 4, and FIG. 5. The memory mentioned above may be a read-only memory (ROM), another type of static storage device that can store static information and instructions, a random access memory (RAM), or the like.

It may be clearly understood by persons skilled in the art that, for the purpose of convenient and brief description, for a detailed working process of the foregoing described system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory, a random access memory, a magnetic disk, or a compact disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the scope of the technical solutions of embodiments of this application.

What is claimed is:

1. A communication method, wherein the method comprises:

determining, by a first communication apparatus, a first frequency domain resource, wherein the first frequency domain resource is determined from a frequency domain resource pool based on a sensing requirement parameter, wherein the sensing requirement parameter comprises an unambiguous ranging distance, the first frequency domain resource meets a minimum frequency baseline, and the minimum frequency baseline is determined based on the unambiguous ranging distance; and sending, by the first communication apparatus, a sensing signal on the first frequency domain resource to a second communication apparatus.

2. The method according to claim 1, wherein the sensing requirement parameter comprises a ranging resolution.

3. The method according to claim 1, wherein the method further comprises receiving, by the first communication apparatus, the sensing requirement parameter.

4. The method according to claim 3, wherein the receiving, by the first communication apparatus, the sensing requirement parameter comprises:

receiving, by the first communication apparatus, the sensing requirement parameter from a third communication apparatus.

5. The method according to claim 2, wherein the first frequency domain resource meets a maximum frequency baseline, and the maximum frequency baseline is based on the ranging resolution.

6. The method according to claim 5, wherein the first frequency domain resource comprises a frequency point combination, and the frequency point combination is a frequency point combination that meets a first condition;

the first condition comprises: frequency baselines formed by frequency points comprised in the frequency point combination comprise a frequency baseline of a first length; and the first length is k*length of the minimum frequency baseline, k is a positive integer belonging to [1, K], K is a ratio of a length of the maximum frequency baseline to the length of the minimum frequency baseline, and K is greater than or equal to 1.

7. The method according to claim 6, wherein the frequency point combination comprises a subcarrier combination, and the subcarrier combination is a subcarrier combination with a smallest quantity of subcarriers in a subcarrier combination that meets the minimum frequency baseline, the maximum frequency baseline, and the first condition.

8. The method according to claim 1, wherein the method further comprises:

sending, by the first communication apparatus, first information to the second communication apparatus, wherein the first information indicates a frequency domain position of the first frequency domain resource.

9. The method according to claim 8, wherein the first information comprises the frequency domain position of the first frequency domain resource; or the first information comprises a sensing quality index, and the sensing quality index indicates the frequency domain position of the first frequency domain resource.

10. The method according to claim 8, wherein the first information is carried in radio resource control (RRC) signaling or downlink control information (DCI) signaling.

11. The method according to claim 1, wherein the method further comprises:

sending, by the first communication apparatus, trigger signaling to the second communication apparatus, wherein the trigger signaling is used to trigger the second communication apparatus to enable a sensing function.

12. The method according to claim 11, wherein a type of the trigger signaling comprises RRC signaling or DCI signaling.

13. The method according to claim 1, wherein the frequency domain resource pool comprises a frequency domain resource used to transmit a channel state information reference signal between the first communication apparatus and the second communication apparatus; or the frequency domain resource pool comprises a frequency domain resource used to transmit communication data between the first communication apparatus and the second communication apparatus.

14. A communication method, wherein the method comprises:

determining, by a second communication apparatus, a first frequency domain resource, wherein the first frequency domain resource is determined from a frequency domain resource pool based on a sensing requirement parameter, wherein the sensing requirement parameter comprises an unambiguous ranging distance, the first frequency domain resource meets a minimum frequency baseline, and the minimum frequency baseline is determined based on the unambiguous ranging distance;

receiving, by the second communication apparatus, a sensing signal on the first frequency domain resource from a first communication apparatus; and performing, by the second communication apparatus, sensing measurement on the sensing signal to obtain a sensing result.

15. The method according to claim 14, wherein the sensing requirement parameter comprises a ranging resolution.

16. The method according to claim 14, wherein the method further comprises:

receiving, by the second communication apparatus, first information, wherein the first information indicates a frequency domain position of the first frequency domain resource.

17. The method according to claim 16, wherein the first information comprises the frequency domain position of the first frequency domain resource; or the first information comprises a sensing quality index, and the sensing quality index indicates the frequency domain position of the first frequency domain resource.

18. The method according to claim 14, wherein the method further comprises:

receiving, by the second communication apparatus, the sensing requirement parameter.

19. The method according to claim 15, wherein the first frequency domain resource meets a maximum frequency baseline, and the maximum frequency baseline is based on the ranging resolution.

20. A communication apparatus, wherein the communication apparatus comprises a processor and a memory;

the memory is configured to store a computer program; and the processor is configured to invoke and run the computer program stored in the memory, to enable the communication apparatus to perform operations of:

determining, by the communication apparatus, a first frequency domain resource, wherein the first frequency domain resource is determined from a frequency domain resource pool based on a sensing requirement parameter, wherein the sensing requirement parameter comprises an unambiguous ranging distance, the first frequency domain resource meets a minimum frequency baseline, and the minimum frequency baseline is determined based on the unambiguous ranging distance; and sending, by the communication apparatus, a sensing signal on the first frequency domain resource to a second communication apparatus.

\* \* \* \* \*